(12) United States Patent
Bonsma et al.

(10) Patent No.: US 7,586,853 B2
(45) Date of Patent: Sep. 8, 2009

(54) NETWORK LOCATION MANAGEMENT SYSTEM

(75) Inventors: Erwin R. Bonsma, Ipswich (GB); Cefn R. Hoile, Ipswich (GB)

(73) Assignee: British Telecommunications plc, London (GB)

(*) Notice: Subject to any disclaimer, the term of this patent is extended or adjusted under 35 U.S.C. 154(b) by 712 days.

(21) Appl. No.: 10/491,086

(22) PCT Filed: Oct. 11, 2002

(86) PCT No.: PCT/GB02/04645

§ 371 (c)(1),
(2), (4) Date: Mar. 29, 2004

(87) PCT Pub. No.: WO03/034669

PCT Pub. Date: Apr. 24, 2003

(65) Prior Publication Data

US 2004/0246911 A1 Dec. 9, 2004

(30) Foreign Application Priority Data

Oct. 17, 2001 (GB) ............................ 0124927.5
May 15, 2002 (GB) ............................ 0211130.0

(51) Int. Cl.
*H04L 12/28* (2006.01)
(52) U.S. Cl. .................. 370/254; 370/386; 370/395.32; 370/400; 370/419
(58) Field of Classification Search ................ 370/254, 370/255, 256, 257, 258, 355, 356, 357, 397, 370/399, 395.3, 395.32
See application file for complete search history.

(56) References Cited

U.S. PATENT DOCUMENTS 4,939,726 A   7/1990  Flammer et al.

(Continued)

FOREIGN PATENT DOCUMENTS

DE          197 33 586          2/1999

(Continued)

OTHER PUBLICATIONS

Ratnasamy et al, A Scalable Content-Addressable Network, ACIRI, pp. 161-172.*

(Continued)

*Primary Examiner*—Hassan Kizou
*Assistant Examiner*—Mounir Moutaouakil
(74) *Attorney, Agent, or Firm*—Nixon & Vanderhye PC

(57) ABSTRACT

In a communications network environment, nodes, such as personal computers, are assigned co-ordinates in a co-ordinate space which is independent of network address and physical location. Each node maintains links to a limited set of other nodes by storing the network addresses for those selected nodes. Each stored network address represents a link in co-ordinate space. It becomes possible for any node to obtain the network address for a target node by initiating a query message to a node for which it has the network address, which query message is propagated through the network between nodes which have the network address for a next node across co-ordinate space. When a receiving node finds it is the target node, or is as close in co-ordinate space as it is possible to forward the query message, it returns its own network address to the initiating node. This technique can also be used to retrieve information other than network addresses—such as objects.

37 Claims, 19 Drawing Sheets

U.S. PATENT DOCUMENTS

| | | | |
|---|---|---|---|
| 5,115,433 A | 5/1992 | Baran et al. | |
| 5,488,608 A | 1/1996 | Flammer, III | |
| 6,246,692 B1* | 6/2001 | Dai et al. | 370/438 |
| 6,385,197 B1* | 5/2002 | Sugihara | 370/380 |
| 6,490,289 B1* | 12/2002 | Zhang et al. | 370/401 |
| 7,158,484 B1* | 1/2007 | Ahmed et al. | 370/254 |
| 2002/0054572 A1* | 5/2002 | Saleh et al. | 370/254 |
| 2002/0144001 A1* | 10/2002 | Collins et al. | 709/250 |
| 2002/0154607 A1* | 10/2002 | Forstadius et al. | 370/311 |
| 2003/0058804 A1* | 3/2003 | Saleh et al. | 370/254 |
| 2004/0246911 A1* | 12/2004 | Bonsma et al. | 370/254 |
| 2006/0036675 A1* | 2/2006 | Crichlow | 709/203 |
| 2006/0077909 A1* | 4/2006 | Saleh et al. | 370/254 |
| 2006/0165015 A1* | 7/2006 | Melick et al. | 370/254 |
| 2007/0097885 A1* | 5/2007 | Traversat et al. | 370/254 |

FOREIGN PATENT DOCUMENTS

| | | |
|---|---|---|
| EP | 1 134 940 | 9/2001 |
| WO | WO 01/22656 | 3/2001 |

OTHER PUBLICATIONS

Ratnasamy et al, "A scalable content-addressable network", ACMSIGCOMM 2001 Conference. Applications, Technologies, Architectures, and Protocols for Computer Communications, San Diego, CA, USA, Aug. 27-31, 2001, vol. 31, No. 4, pp. 161-172, Computer Communication Review, Oct. 2001, ACM, USA.

Pearlman et al, "Determining the Optimal Configuration for the Zone Routing Protocol", IEEE Journal on Selected Areas in Communications, IEEE Inc. New York, US, vol. 17, No. 8, Aug. 1999, pp. 1395-1414.

Amouris et al, "A position-based multi-zone routing protocol for wide area mobile ad-hoc networks" Vehicular Technology Conference, 1999, IEEE 49th Houston, TX, USA, May 16-20, 1999, Piscataway, NY, USA, IEEE, US, May 16, 1999. pp. 1365-1369.

Stevens, "TCP/IP Illustrated, vol. 1—The Protocols", Addison Wesley, pp. 33, 51, 85 and 110.

Corson et al, "Mobile Ad Hoc Networking (MANET): Routing Protocol Performance Issues and Evaluation Considerations", Requests for Comments, Jan. 1999.

Haas et al, "The Zone Routing Protocol (ZRP) for Ad Hoc Networks" Internet Draft, Nov. 1997.

* cited by examiner

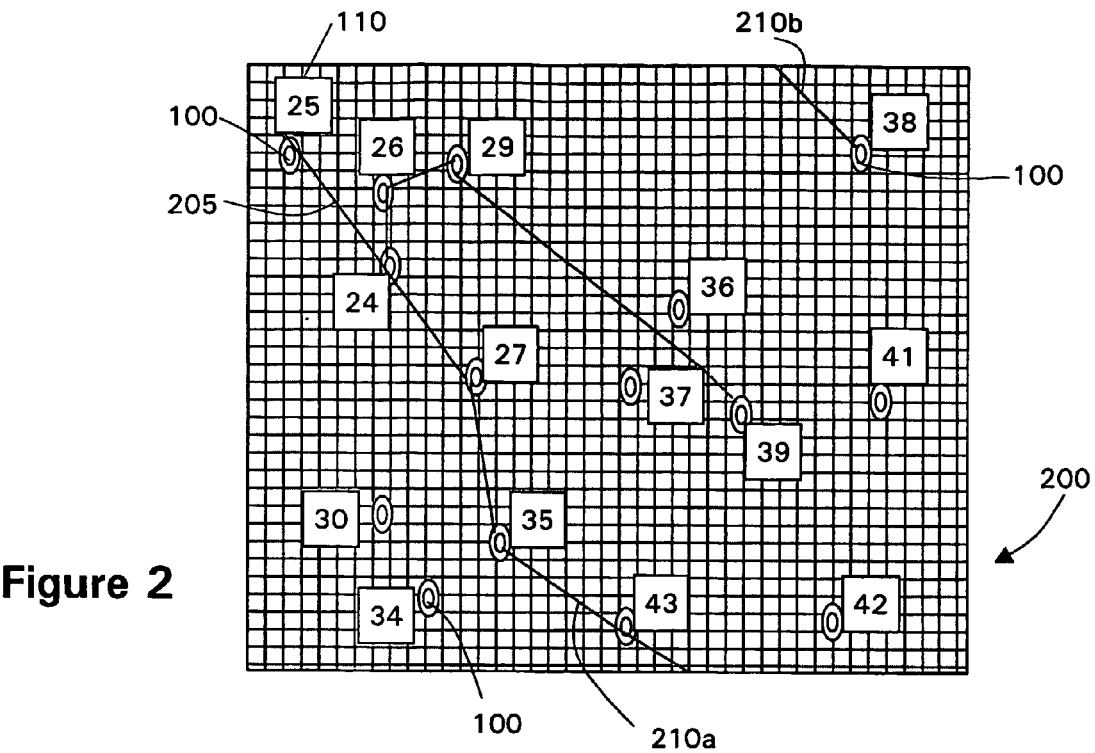
Figure 2
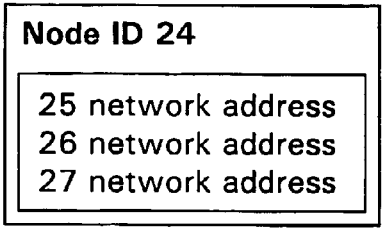
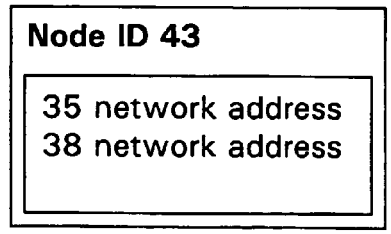
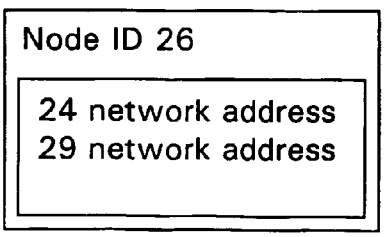
Figure 3

C: carrier agent (carries messages from one environment to another)

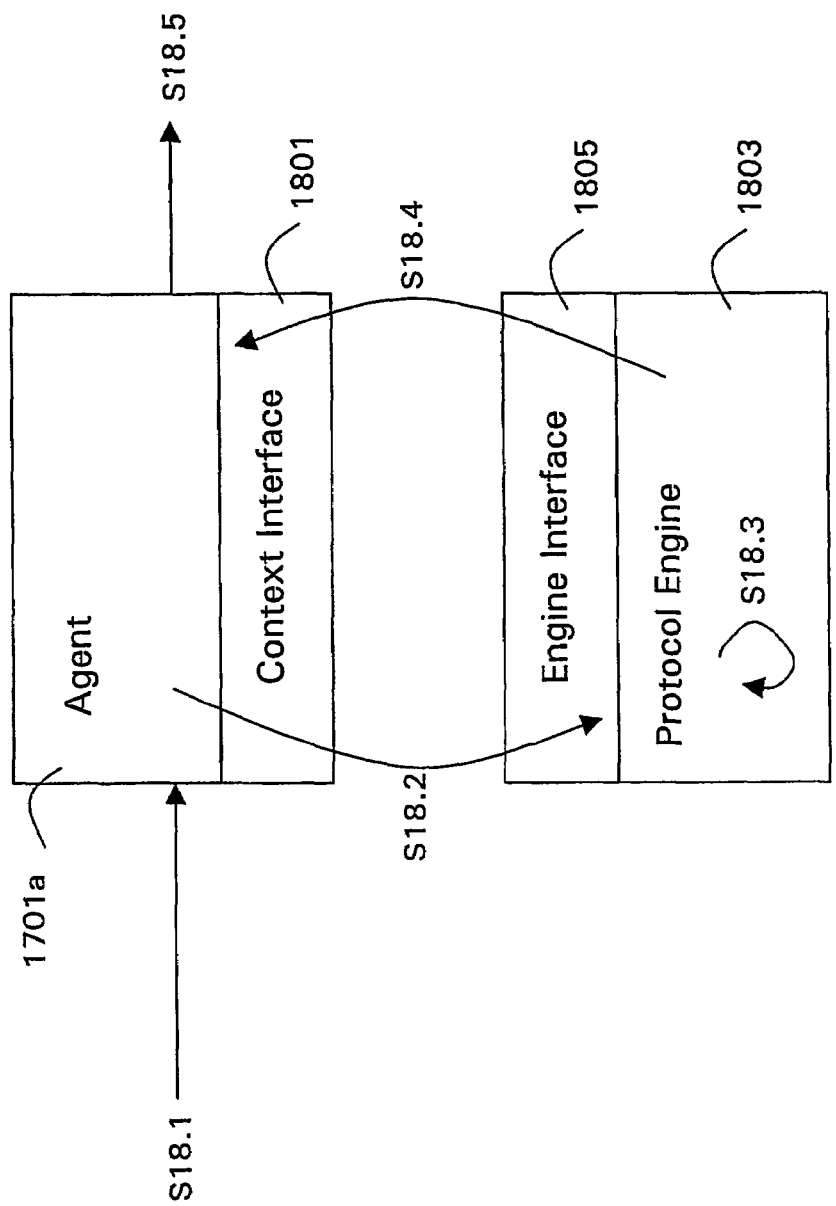

NETWORK LOCATION MANAGEMENT SYSTEM

This application is the US national phase of international application PCT/GB02/04645 filed 11 Oct. 2002 which designated the U.S. and claims benefit of GB 0124927.5 and GB 0211130.0, dated 17 Oct. 2001 and 15 May 2002, respectively, the entire content of which is hereby incorporated by reference.

BACKGROUND

1. Technical Field

The present invention relates to managing locations of nodes in a communications network and finds particular application in distributed or partially distributed networks.

Nodes in this context are elements of platform or software which other such elements might need to communicate with over a network. Nodes which might need to communicate in this manner could include applications, software agents and databases, and equipment which supports those, such as computers, client devices, server devices, or portable user devices such as laptop computers or personal digital assistants. Nodes of the same and/or different types may need to communicate with each other.

It is known that nodes can have both an identity and a network address. A node can then change network address and a new network address can be recorded for the existing identity. This allows tracking of mobile nodes, such as mobile software agents, in a network. Such an arrangement might use a lookup table or a register to record current network addresses against identity so that communications can be correctly routed to find a target node. Such a system makes it possible to find and contact any node in the system by specifying its identity, even when node identities are completely independent of the address and the physical location of the node. This is useful in a wide range of applications, such as mobile agent systems, peer-to-peer file storage systems and self-organising data networks.

A straightforward way of providing the above look-up functionality is by creating a single server node that stores the addresses and identities of all other nodes. When a node wants to contact another node, it can contact the server to get the node's current address. The main advantage of such a system is efficiency. Overall, a low number of messages is required to keep the central server up to date and to look up addresses. However, the volume of messages that the server needs to handle can be large. It can therefore need much more processing power than the other nodes in the system, which also makes the system much more expensive. The processing power of the server and its network connection may also limit the scalability of the system. Additionally, the system is not very robust as it fully relies on the server node.

Theoretical work has been done on connectivity in networks based in part on non-global knowledge. A starting point has been "Small World Networks" (SWNs). Stanley Milgram performed social experiments illustrating that human relationships exhibit SWN properties, published in "The small world problem", *Psychology Today* 2, 1967. The results showed that any pair of randomly chosen people in the United States was linked by a small number of acquaintances. Watts and Strogatz looked at a model for generating Small World Networks, published as "Collective dynamics of 'small-world' networks", by Duncan J. Watts and Steven H. Strogatz, in *Nature* 393, 440, June 1998. They characterised SWNs as networks that have high clustering, while the characteristic path length is small, which means that a relatively short path typically connects any pair of nodes. The model used was very simple. They started with a regular network and high local clustering by giving every node short-range links to all neighbouring nodes within a certain range. They showed that replacing a few of these short-range links by random links to other nodes in the network was sufficient to significantly lower the characteristic path length. However, although most nodes are connected by short paths, these cannot be discovered efficiently without using global knowledge. Kleinberg presented an additional constraint that must be satisfied if short paths between arbitrary nodes are to be identified from local knowledge only, published as "The Small-World Phenomenon: An Algorithmic Perspective", by Jon Kleinberg in *Cornell Computer Science Technical Report* 99-1776, October 1999. Kleinberg concluded that the long-range links need to be chosen such that they are nearly uniformly distributed over all "distance scales". More specifically, the probability that there is a long-range link from one node to another node must be proportional to the inverse $r^{th}$-power of the distance between both nodes. With respect to the short-range links, the network model used in the proof was a perfect-grid network model.

BRIEF SUMMARY

These previous pieces of work rely on particular network models or some global knowledge and/or links which conform to predetermined constraints.

According to a first aspect of the present invention, there is provided apparatus for use in identifying information in respect of nodes in a network, wherein the network includes a plurality of nodes and communications links therebetween, the apparatus comprising receiving means arranged to receive, on behalf of a node, a request in respect of information relating to a target node, the request including an identifier indicative of the location of the target node, wherein the location is independent of physical location and network address;

sending means arranged to send, on behalf of the said node, a request in respect of said target node, storage arranged to store data in respect of a plurality of nodes, the data including, for each such node, an identifier indicative of location of the node and a network address corresponding thereto, wherein the location is independent of physical location and network address;

evaluating means arranged to evaluate the distance between the location of two nodes;

the apparatus being arranged, upon receipt of such a request, such that the evaluating means evaluates the distance between the location of each of a plurality of nodes and the target location, at least one of the evaluated plurality being the receiving node, and identifies which of the plurality of nodes are closer to the target node than the receiving node is to the target node, and the sending means sends the request to the identified node.

Preferably the information to be retrieved is the network address of the target node. Alternatively it can be data such as an object (e.g. a string, an integer etc.).

Conveniently the request message includes the network address of the node from which the request message originated, and the receiving means is arranged to identify the node from which the request message originated. Additionally the sending means is arranged to send a response message to the originating node in the event that none of the identified nodes are closer to the target node than the receiving node is to the target node.

European patent application EP 1134940, and documents Pearlman et al (XP-000965185), Haas et al (XP-002153515) and Corson et al (XP-002173722) disclose routing methods that can be applied to ad-hoc networks. When a node wishes to send a message to another node (destination node) in an ad-hoc network, it has to identify the location of the destination node and identify a route via which the message can be sent. Communication between nodes in such networks is constrained by the physical location of the nodes, so that identifying the location of a node typically involves flooding the network with a query message. As a result the number of query messages that are required to successfully service a query is of the order of the total number of nodes in the network.

In contrast, nodes in the present invention have a location that is independent of both their physical location and their network address. This is essentially a location in a virtual network, and it is this virtual network that is used to identify a node: messages requesting the network address of a destination node are sent from one node to another, and decisions regarding routing of the request messages are dependent on the locations of nodes in this virtual network. Thus embodiments of the invention do not involve any kind of broadcasting and the number of messages that are required to find a node of interest is several orders of magnitude smaller than it is with ad-hoc networks.

Typically a network management system will include embodiments of the invention in addition to routing mechanisms. An embodiment of the invention essentially provides a means of building a virtual network of linked nodes, which can be used to track down a node. Using a location that is independent of network address and physical location means that, even if a node itself is moved and/or changes network address the location of the node, in the context of its identifier, is unchanged.

Embodiments of the present invention provide a practical way of applying the principle of small world networks to communication networks. This can be done by building a virtual network of links between nodes, using small world network principles in the selection of the links, and using the virtual network to select message paths between nodes via the communications network. Essentially, a link is made when a node has access to the network location data for another node and thus is a manifestation of the distribution of data in the system.

The sending means may select a node for onward transmission of the request in accordance with either or both of degree of proximity to the target node or/and transmission characteristics between the receiving node and the identified node. Typical transmission characteristics could include speed and robustness of communication links between nodes. These characteristics can be identified via the receipt and processing of acknowledgement messages sent in response to receipt of a request message.

The apparatus may include transforming means for transforming a node identifier into the location in identifier space. Preferably, there are multiple transformation means distributed in the communications network so that network traffic is kept relatively low in use of the transformation means. Each node may have access to local transformation means, or may itself comprise transformation means. Local in this context might for instance mean supported by the same platform, or perhaps accessible over a local area network. Such an arrangement can reduce network traffic overall.

It is beneficial if nodes are equipped to respond to request messages in the event that none of the nodes to which the request messages are forwarded can provide the network address of the target node. For instance, a node having a location that is closest to that of the target node might send a response message containing its own network address instead of the target node's network address. Such an arrangement has several benefits. The node which sends the response message may be an acceptable substitute for the target node, and receipt of a response message containing a network address for a node which is not the target node provides an alert to the system. It may be for instance that the target node does not exist, or was identified incorrectly, or that the network is incomplete or not optimally organised.

As mentioned above, the stored data includes network address data. Whenever one node has the network address of another node, and vice-versa, this can be represented as a link between the nodes.

According to a second aspect of the present invention there is provided network management apparatus, wherein the network includes a plurality of nodes and communications links therebetween, wherein each node is arranged to send a message through the network, the message including an identifier indicative of the location of the node from which the message originated, wherein the location is independent of physical location and network address, the apparatus comprising receiving means arranged to identify the type of message received by a node;

storage arranged to store data in respect of a plurality of nodes, the data including, for each such node, an identifier indicative of location of the node and a network address corresponding thereto, wherein the location is independent of physical location and network address;

evaluating means arranged to evaluate the distance between the locations of two nodes;

the apparatus being arranged, in receipt of a message, such that the receiving means identifies the type of message, and, if the message is identified as being an actionable type of message, the evaluating means evaluates the distance between the location of each of a plurality of nodes and that of the originating node and identifies which of the plurality of nodes is closest to the originating node, wherein the evaluated plurality includes the receiving node, and, if the identified node is the receiving node, data items in respect of the originating node are added to the storage.

Such data items can be viewed as "short range" links. In this way, the stored data corresponds to nodes whose locations are relatively close to its own. It is advantageous if each node also has access to, or stores, network addresses for at least one other node whose location is relatively distant from its own. This can be viewed as a set of one or more "long range" links.

Accordingly, the data stored in the storage preferably includes an inter-node distance and, for at least some of the plurality of nodes, distance values associated therewith (where these "at least some nodes" are the long-range links). The long-range links are updated in dependence on the distribution of nodes—i.e. on the number of nodes in the network. In order to facilitate updating of long-range links, the apparatus includes quantifying means arranged to estimate the distribution of locations of nodes in the network, and to quantify the same as the inter-node distance; and modifying means arranged to modify a distance value associated with one of the plurality of nodes in accordance with an exponential expression involving the inter-node distance. In use, the quantifying means estimates and quantifies the inter-node distance, and, for at least one of the stored plurality of nodes, the modifying means modifies the distance value corresponding thereto in dependence on a selective modification criterion.

The selective modification criterion involves, for example, a stochastic expression, which effectively means that a long-range link is selected for updating at random.

Preferably, the data in respect of the plurality of nodes are stored as sets of links, and the storage can include one or more such sets. Having more than one such set provides a backup mechanism in the event of node failure, since, if a node sends a request message to a node from a first set of links and the transmission of the request message fails, the node can instead select a substitute node from a second set of links, and send the request message to that node.

The acknowledgement messages described above as being sent in response to receipt of a request message can also be sent in response to receipt of an onward transmission type message and an actionable type message.

This provides self-organisation of the network, and is an important aspect of the invention. A system of initially randomly "connected" nodes (ie nodes having the network addresses of other nodes) can then self-organise such that for instance the specific SWN properties outlined by Kleinberg above hold. If this is done, it is possible to ensure that the processing required to successfully identify a target node scales well with respect to the total number of nodes.

Each node is preferably equipped with the apparatus although the apparatus could instead be provided local to nodes without departing too far from the concept of a distributed environment as an environment in which there is no centralisation of resources. As already mentioned above, this also applies to the transforming means for transforming identifiers.

Messages may conveniently be transmitted via the communications network to which the nodes are connected but this is not essential.

Conveniently the location may have one or more dimensions.

According to third and fourth aspects of the present invention, there are provided methods corresponding to the apparatus described hereinabove.

BRIEF DESCRIPTION OF THE DRAWINGS

An address management system will now be described as an embodiment of the present invention, by way of example only, with reference to the accompanying figures in which:

FIG. 2 shows identities of the nodes of FIG. 1, distributed at co-ordinates in identity space;

FIG. 3 shows data held by representative nodes whose identities appear in the identity space of FIG. 2, which data supports virtual links in the identity space;

FIG. 18 is a schematic diagram showing an embodiment of the invention implemented in a first agent arrangement, together with steps carried out thereby.

DETAILED DESCRIPTION OF EXEMPLARY EMBODIMENTS

Network Context

Figure 1:
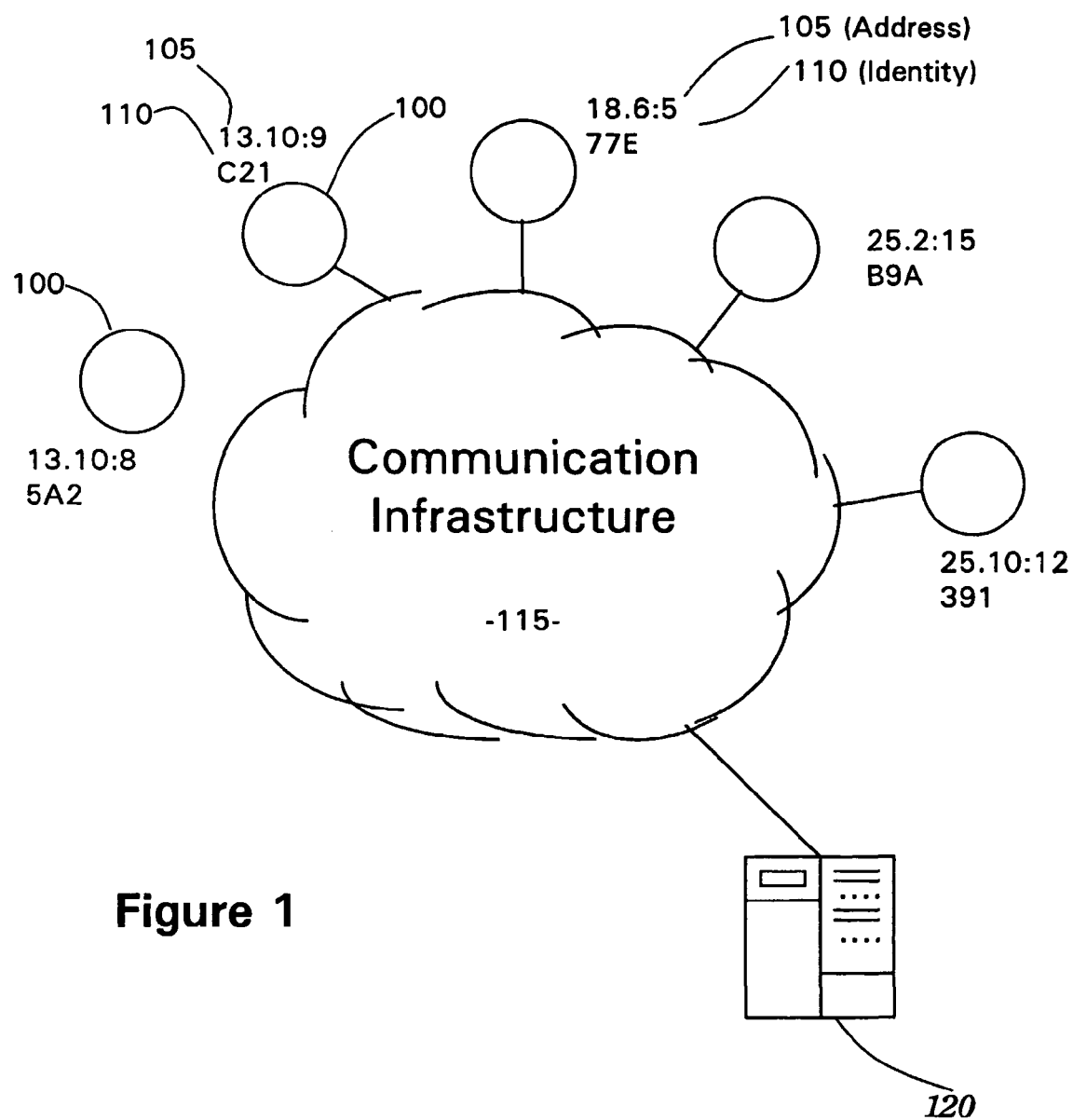
FIG. 1 shows schematically a set of nodes arranged in a network context in which the system could be used.

Referring to FIG. 1, a known network context in which the system could be used comprises a set of nodes 100 that are connected by a communication infrastructure 115. The infrastructure 115 could be the Internet, for example. Each node has an identity 110 and an address 105 in the infrastructure. A node 100 connected to the infrastructure 115 can potentially use the infrastructure 115 to send a message to any other such node 100 by specifying an address 105 in the infrastructure 115 for the target node.

Nodes 100 in this context can be any element which might have an identity and a network address. The communication infrastructure 115 could be the Internet plus local access networks, and addresses could be Internet Protocol (IP) addresses together with appropriate port numbers. Examples of possible nodes are computers, clients, servers, databases, files, mobile software agents, service providers, and data items, among others.

Overview of Embodiments of the Invention

Nodes will generally store at least some data in the way of identities and addresses corresponding to a limited number of other nodes and they are configured with means for sending and receiving at least a limited set of message types. The storage capacity used by a node for data might be provided by the node itself or might be space available to it on its own or another platform.

As stated above, as well as having an address 105, every node 100 also has an identity 110 comprising a bitstring of a fixed length associated with it. In the basic method described below, it is assumed that identities are globally unique and each node is assigned a randomly generated identity on creation (see the description under the headings "Creation of IDs" and "Translating IDs to co-ordinates in ID space" below). Having a randomly generated identity is not essential, and indeed in some cases the IDs may well represent meaningful names or identifiers, such as postcodes, file names, or even a combination of such information.

As stated in the background section, in known systems, if a node 100 does not have an address 105 for the target node, it refers to an address server 120 connected to the infrastructure 115 and obtains a network address 105 which has been logged against the identity 110 of the target node 100. However, in the network location management system according to an embodiment of the present invention, there is no centralised, or even partially centralised, record of addresses logged against node identities (IDs).

An embodiment of the invention is preferably distributed over a peer-to-peer system. One advantage of such an embodiment is that all components can be relatively basic and inexpensive, since there is no requirement for one or more high-spec centralised resources to which, potentially, nobody can or would like to contribute.

Nodes represented in ID space 200 have two characteristics. Firstly, each node 100 knows the network addresses of a few other nodes 100 and can therefore send messages to them. Secondly, there is a predictable relationship between every node's ID 110 and its co-ordinates in ID space 200. If a node needs to communicate with a node for which it has no address, it translates the target node's ID 110 into co-ordinates in ID space 200 and initiates a "FIND" request through the infrastructure to a node for which it has the address and which has an ID located in ID space closer to the target node than that of the initiating node. The message is passed onwards in the same manner, always to nodes whose ID co-ordinates in ID space are closer to the co-ordinates of the target node's ID in ID space. At some point, it will reach a node which either has the network address of the target node, is itself the target node, or is an acceptable substitute. The "FIND" request carries with it the ID and network address of the initiating node and the network address for the target node or for the substitute can now be returned to the initiating node over the infrastructure 115 and direct communication can subsequently take place using the routing mechanisms of the infrastructure 115.

Embodiments are scalable. This arises from the fact that the amount of effort required per node to configure the system such that it can successfully handle "FIND" requests is exponentially smaller than the total number of nodes. Similarly, the average number of messages that need to be sent to satisfy a "FIND" request is exponentially smaller than the total number of nodes.

FIG. 2 shows the ID space 200 and a plurality of nodes 100 represented by their IDs 110 at locations in ID space 200. Where a node 100 knows the network address 105 of another node 100, this is shown as a link 205, 210a, 201b on FIG. 2, where the two nodes can send messages to each other using the infrastructure 115. If the link is one-way only, in that a first node has the address for a second node but the second node does not have the address for the first, this is shown as a link, which is partly dotted. An example is the link between nodes 29 and 39. The ID space 200 is Euclidean in terms of the distance measure used to calculate the distance between any two co-ordinates in the ID space 200 and its edges "wrap" in ID space 200. This can be seen in that the link 210a, 210b from node 43 to node 38 is "continuous" across the disjunction of the bottom and top of the ID space 200.

The mechanism by which nodes retrieve network addresses of nodes with which they wish to communicate is now illustrated with reference to nodes 24, 26 and 43 shown in FIG. 3. We assume that node 43 requires the network address for node 24, which is a node for which it does not hold any information. Accordingly, node 43 converts "24" to co-ordinates in ID space 200, and identifies which node, of those for which it has information, is closer to the target node 24 in ID space 200. In this example, node 35 is closer to node 24, so node 43 sends a "FIND" message (described below) to node 35. Node 35 repeats the process, forwarding the "FIND" message to node 27, which in turn forwards it to node 24. Node 24 recognises itself to be the target node and uses details of the initiating node (node 43) to return a "FOUND" message to node 43. Node 43 can now communicate directly with node 24.

The above describes an example of the overall idea of using a virtual multidimensional space in order to migrate a message towards a target node and obtain a network address of the target node. This seemingly straightforward process has several aspects, which, in practice, add complexity thereto. If node 24 needed to get the network address for node 37, the mechanism described above would lead node 24 to send the first message to node 27 as it is closer to node 37 in ID space than node 26. But the message has now been launched along a path that cannot directly reach node 37, or reach the closest node to node 37 for which it has a link, which is node 39, and will probably terminate at node 43. The manner in which the links are created and extended is therefore important. It is important that nodes can be added and deleted with appropriate updating of the links.

An embodiment of the invention will now be described in more detail. Firstly node identities and co-ordinates corresponding thereto are described, in the context of one or more examples. Thereafter the node apparatus is described with reference to the types of messages that are generated and the ways in which such messages are processed by the apparatus.

Creation of IDs

As stated above, IDs can be randomly generated. It is known to use a hashing algorithm such as SHA-1, a known standard, to generate IDs of this type.

Details of the standard are available from a website, published by Federal Information Processing Standards Publication 180-1, available from the National Institute of Standards and Technology at September 2001. Usually a reference to a document on a website takes the form of a first part indicating the network delivery mechanism (e.g. http:// or ftp:// for the hypertext transfer protocol or file transfer protocol respectively) followed by the network address of the server (e.g. www.server1.com) suffixed with the name of the file that is being requested.

Such an algorithm takes data of any length (1 byte up to the order of mega bytes) and calculates a 160 bit representation for it. So in this way an identity can be generated of a given length for any type of data. The data input to the SHA-1 algorithm for a node could be either short human-readable strings associated with the node or even the content of the node itself, such as an mp3 file.

A further feature of the SHA-1 algorithm is that any representation generated thereby can be considered random; i.e. two very similar names (e.g. that differ in only one character) would result in completely different identities. This is a desirable characteristic, as it helps to create an ID space 200 with all nodes 100 distributed uniformly. As a result, processing load will be spread equally over all nodes.

In FIG. 1, a set of identities 110 is shown: 5A2, C21, 77E, B9A, 391 (hexadecimal values used for illustrative purposes only; each three character string could alternatively be converted to a 12 bit binary string).

FIGS. 4 to 7 show screenshots of visualisations of ID space 200 in use. This type of visualisation might for instance be available to a system manager for troubleshooting or capacity planning. It should be noted that in a distributed system, information on existing links would have to be requested from all the nodes so that a visualisation as shown in FIGS. 4-7 is not indicative of a real-time situation.

Figure 4:
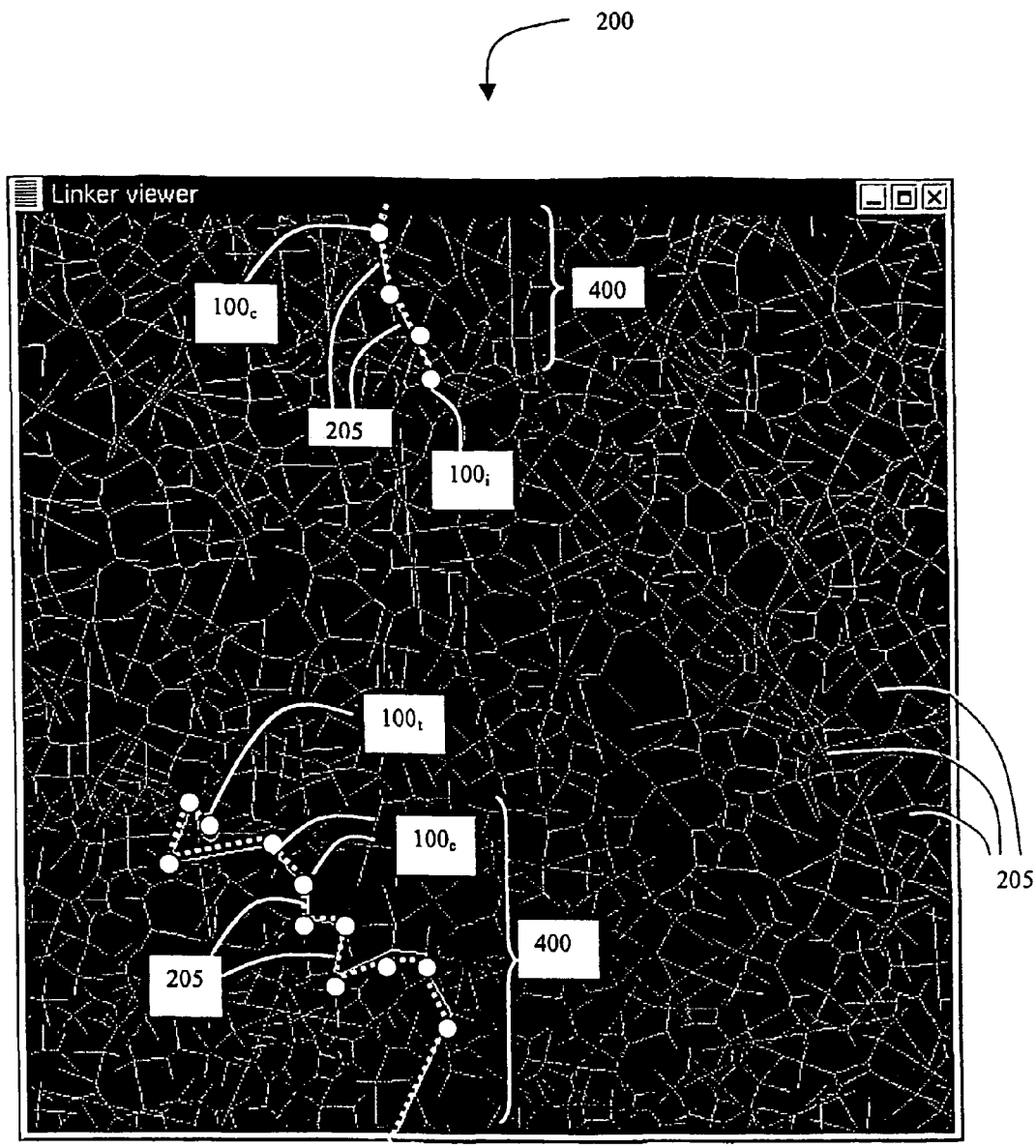
FIG. 4 shows a screenshot of visualisation of a short range link network in identity space being used to select paths for messages travelling between nodes.
Figure 5:
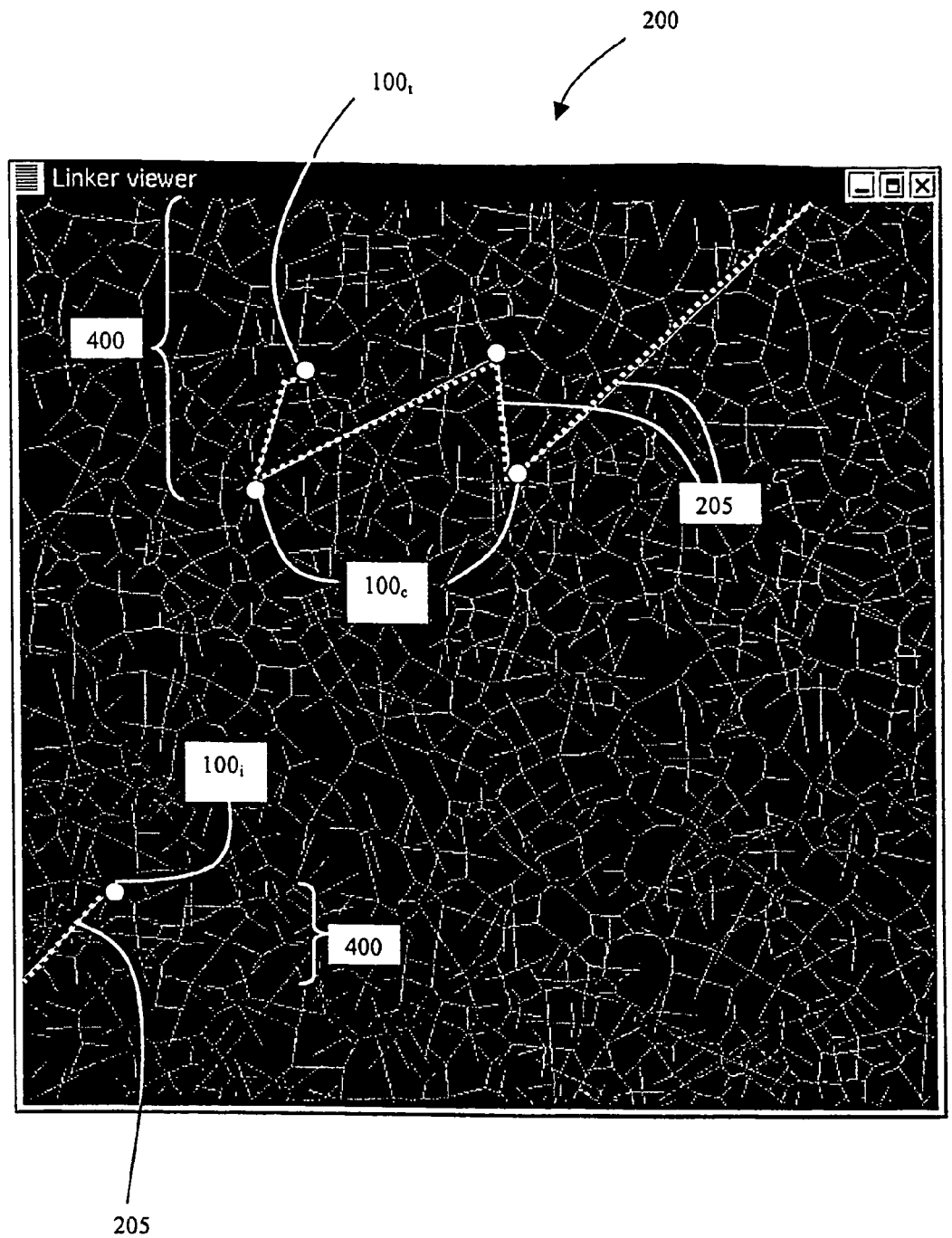
FIG. 5 shows a screenshot of visualisation of both short and long range link networks in identity space being used to select paths for messages travelling between nodes.

In FIGS. 4 and 5, the screenshots each show a complex network of existing links 205 between node identifiers. The node identifiers in these complex networks are not generally visible but lie at the ends of all the links. Each link 205 represents the situation where one node has the ID and network address of another node. These are not necessarily mutual and where only one node of a linked pair has the data for the other node, the link 205 is shown in two parts, one as a dotted line link and one as a full line link. (It should be noted that these Figures show ID space 200 and thus what is actually shown is links 205 between co-ordinates created from the node identifiers, not the nodes themselves. However, since there is a one-to-one relationship, the reference numeral 100 has been used for the co-ordinate positions selected for discussion.)

In each of FIGS. 4 and 5, a series of consecutive links 400 is highlighted with a dotted line, indicating the path of a "FIND" request between an initiating node $100_i$ and a target node 100 via intervening consecutive nodes $100_c$. Every link 205 in the series 400 represents a message being sent from one node 100 to another node 100.

FIG. 4 shows the situation where long-range links have been disabled so that nodes 100 can only use short range links 205 to transfer a "FIND" message, whilst FIG. 5 shows the situation where both short and long range links can be used. In FIG. 5, the path 400 of the "FIND" request can be seen to have used significantly fewer links in reaching the ID associated with a target node $100_t$. Only five nodes 100 have been involved in the path of the "FIND" request shown in FIG. 5 whereas there are fifteen nodes 100 in the path of the "FIND" request shown in FIG. 4 which is of comparable length in ID space 200.

Figure 6A:
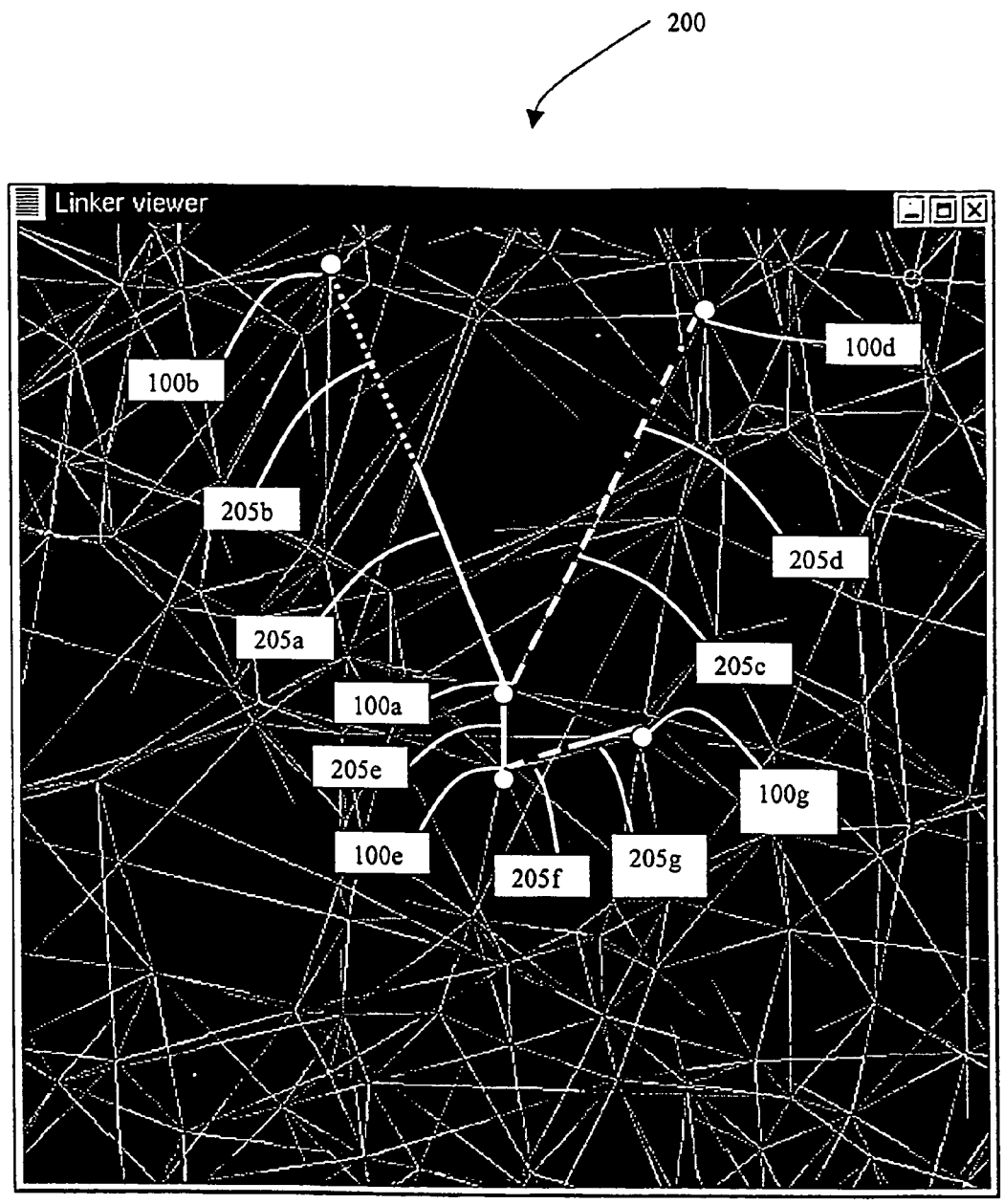
FIGS. 6a and 6b show schematic configurations of short range links in identity space, wherein there are multiple sets of short range links.
Figure 6B:
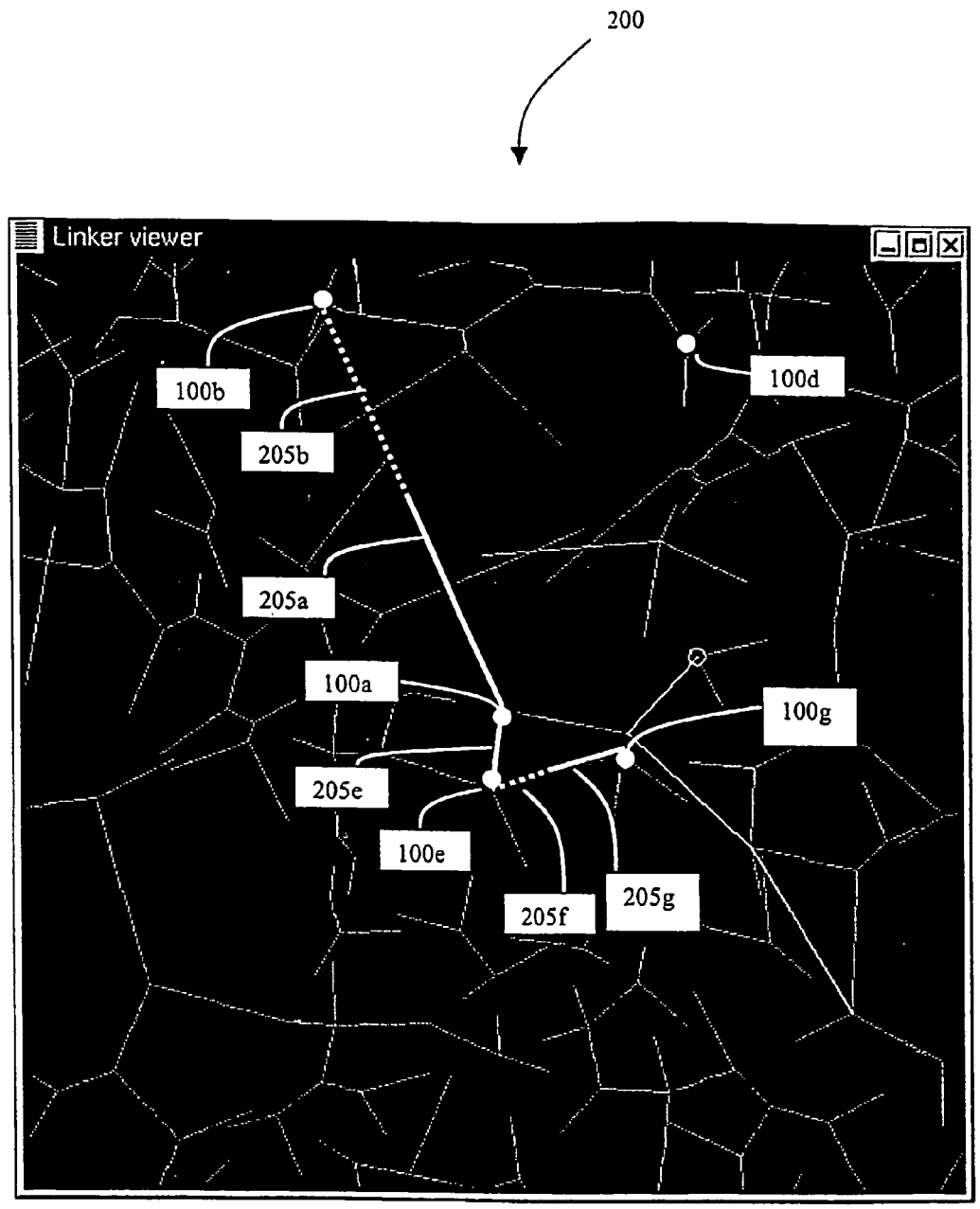
Figure 7:
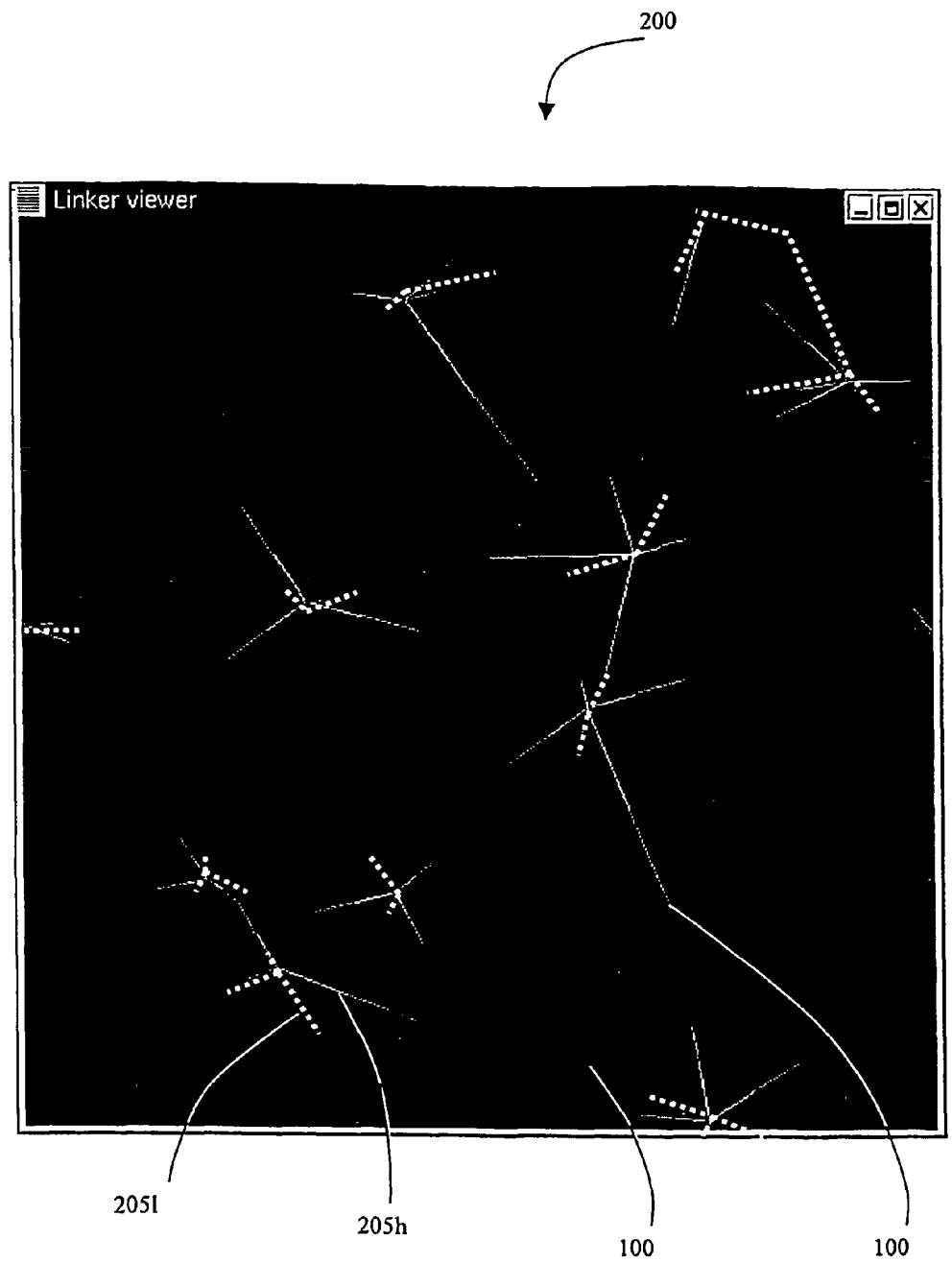
FIG. 7 shows further schematic configurations of short range link networks in identity space in the case that there are multiple sets of short range links.

FIGS. 6 and 7 show the situation where each node 100 maintains two sets of short range links 205. These are further discussed under the heading "Multiple Sets of Short Range Links" below.

In preferred embodiments of the present invention, every node in the system can successfully handle "FIND" requests. A "FIND" request is handled successfully if, when given any identity, the address of the corresponding node is returned or, when no such node exists, the address of the node with the identity closest to the target identity is returned.

Translating IDs To Co-Ordinates in ID Space

Unlike translating IDs to network addresses, which are assigned in respect of the communication infrastructure concerned and are not normally predictable from a node's ID, IDs can be directly mapped to co-ordinates in ID space. Given an ID, the corresponding coordinates in ID space can be calculated using a simple deterministic algorithm to construct numeric values from the bits in the ID. Importantly, this can be done locally so that each node can process the same ID and arrive at an identical set of co-ordinates.

EXAMPLE

Assume all IDs comprise 8 bits, and the ID space is two-dimensional. Given a randomly generated ID, for instance 00111001, what is the corresponding co-ordinate in ID space 200?

ID space 200 is two-dimensional, having X and Y axes, so the ID is split into two equal parts: 0011 and 1001. Using a system-wide deterministic algorithm, each element of each part is now multiplied in turn by a respective element of a given series 8, 4, 2, 1 and the products summed.

The X coordinate is given by the result for 0011=0*8+0*4+1*2+1*1=3

The Y coordinate is given by the result for 1001=1*8+0*4+0*2+1*1=9

So the X, Y co-ordinates in ID space are (3,9)

In practice, identities are much longer (e.g 64, 128 or 160 bits), but the process used to derive a co-ordinate can be exactly the same.

A node's location in identity space is independent of its physical location or network address. As described above, a search query ("FIND" request) moves closer to a target node only in identity space. While doing so the search query does not progressively move physically closer to the target node. Unless positively structured in this way, nodes with similar identities are not physically close. In short, the identity space 200 is an artificial space, merely designed such that "FIND" requests can be efficiently handled.

The co-ordinates of the IDs in ID space 200 can be used to calculate a distance between the IDs. This distance is used in several aspects of the invention, particularly self-organising a virtual link network for use in routing "FIND" messages. The dimensionality of the identity space is common throughout the system, every node using an ID space 200 having the same units of distance, which affects the resolution of the system. To calculate the distance between two identities in ID space 200, their respective ID bitstrings are split into parts of equal length. A numeric value corresponding to each part is then used to calculate the distance. The distance measure that is subsequently used is Euclidean distance. The identity space "wraps" at the borders to avoid border effects that would otherwise occur. That is, for example, co-ordinates at the top edge of a square ID space 200 will be found to be closer to co-ordinates at the bottom edge of the space 200 than to co-ordinates located centrally in the space 200.

Calculation of distances in ID space 200 is now described by means of an example: Consider 2 nodes, one of whose ID maps to co-ordinates (0.15, 0.40) and the other of whose ID maps to co-ordinates (0.90, 0.30). Assuming all values fall within the range of [0,1]:

0.15+(1.0−0.9)=0.25 (because these co-ordinates "wrap around the identity space 200) and 0.4−0.3=0.1, so that the distance is $\sqrt{0.25^2 2 + 0.10^2}$=0.269. (In the remainder of this specification, distances always refer to distances in ID space 200 unless the context makes it clear otherwise.)

Node Apparatus

Each node is equipped with software to run a set of processes and with data to support the processes. The processes are:

outputting messages of prespecified types receiving, processing and responding appropriately to incoming messages of the prespecified types, and creating and maintaining data in support of links in ID space for the purpose of processing incoming messages and routing messages to other nodes Each node is initialised with the addresses and identities of a limited number of other nodes, which is different for each node and potentially entirely random. This provides "bootstrap" links to other nodes in the context of the ID space 200. In other words, the nodes are arranged in a very basic peer-to-peer network.

Each node has the following data associated with it during its "lifetime" in the SWAN system:

Data that is initialised when the node is created—
   own identity and address
   several bootstrap links to other nodes. There are no hard constraints on how these links are set up. They can for instance be initialised at random, or to nodes that are physically close. Links are not necessarily bi-directional.
   $\lambda$, a real-valued positive number. It maintains a current lower bound on the desired long-range distances. It is initially set to the maximum distance.

Data that is initialised by the self-organisation process while the node is participating in the SWAN system:
   several short-range links. These are short-range links in identity space. Initially, the node has no short-range links. There is no explicit limit on the number of short-range links in each set. Each node has at least one set of short range links, but potentially can have more than one such set. The PUSH update mechanism (discussed below) sets an upper limit on the number of short-range links in each set. This limit only depends on the dimensionality of the identity space.
   several long-range links, each with a desired distance. All desired distances are initially set to the maximum distance. All links are set to no value.

In the above, each link is simply, as previously discussed, an identity and network address pair of another node, which can be represented in ID space 200. Together with the short-range links, the long-range links jointly make up a virtual identity network in ID space 200. The bootstrap links are there to allow the virtual network to initiate self-organisation since at least some nodes require the network addresses of at least some other nodes in order to enable the network to self-organise into a single related structure. The short and long range links are there to support "FIND" requests. (Although bootstrap links could be used to support "FIND" requests, this does not offer any significant advantages.) The short range links enable a "FIND" request to migrate either to, or to within a short distance of, a node having the target ID. The long range links are there to reduce the number of steps necessary to reach the target ID. The virtual identity network in ID space 200 is developed such that no flooding is necessary to find a target node. At any moment, a "FIND" message is only passed on to one other node 100. This means that even when the number of nodes is very large, the total number of inter-node transmissions needed by a single "FIND" request is still relatively small. For example, in one possible configuration of the network location system supporting 100,000 nodes, only 25 inter-node transmissions on average are needed to find a target node.

In general, every node needs at least two short range links for "FIND" queries to be handled successfully. The exact number of links depends on the dimensionality of the ID space 200. Every node should have short range links for at least a set of nodes nearby in ID space 200 so that for any distant co-ordinate, it has the network address of a node which is closer to the distant co-ordinate in ID space 200. In a one-dimensional ID space 200, every node needs to have at least two short-range links (one to a node with a smaller co-ordinate, one to a node with a higher co-ordinate). In two-dimensional space every node will generally need at least three short-range links and in three-dimensional space at least four. Typically nodes will develop more short-range links during use of the system.

Message Types

Two different mechanisms are used to create the identity network. A "PUSH UPDATE" mechanism is used to provide each node with appropriate short-range links. A "PULL UPDATE" mechanism is used to give every node appropriate long-range links. The names of the two mechanisms are simply descriptive terms. Both mechanisms enable a network to handle "FIND" requests efficiently and in a decentralised fashion.

"FIND" messages are used to initiate and fulfil node look-ups and to support "PULL" updates.

They contain:
   the identity of a target node
   the address of the node that initiated the query "FOUND" messages are used to return the results of queries. They contain:
   the identity of the target node
   the identity of the node that was found
   the address of the node that was found "PUSH" messages advertise a node's ID to other nodes. They contain:
   the identity of a subject node
   the address of the subject node
   the number of hops to go to reach a target node "NOTIFY" messages are used to propagate push-updates. They contain:
   the identity of a subject node
   the address of the subject node These message types are used by the nodes as described below.

Executing a "FIND" Request to Support a Node Lookup

Figure 8:
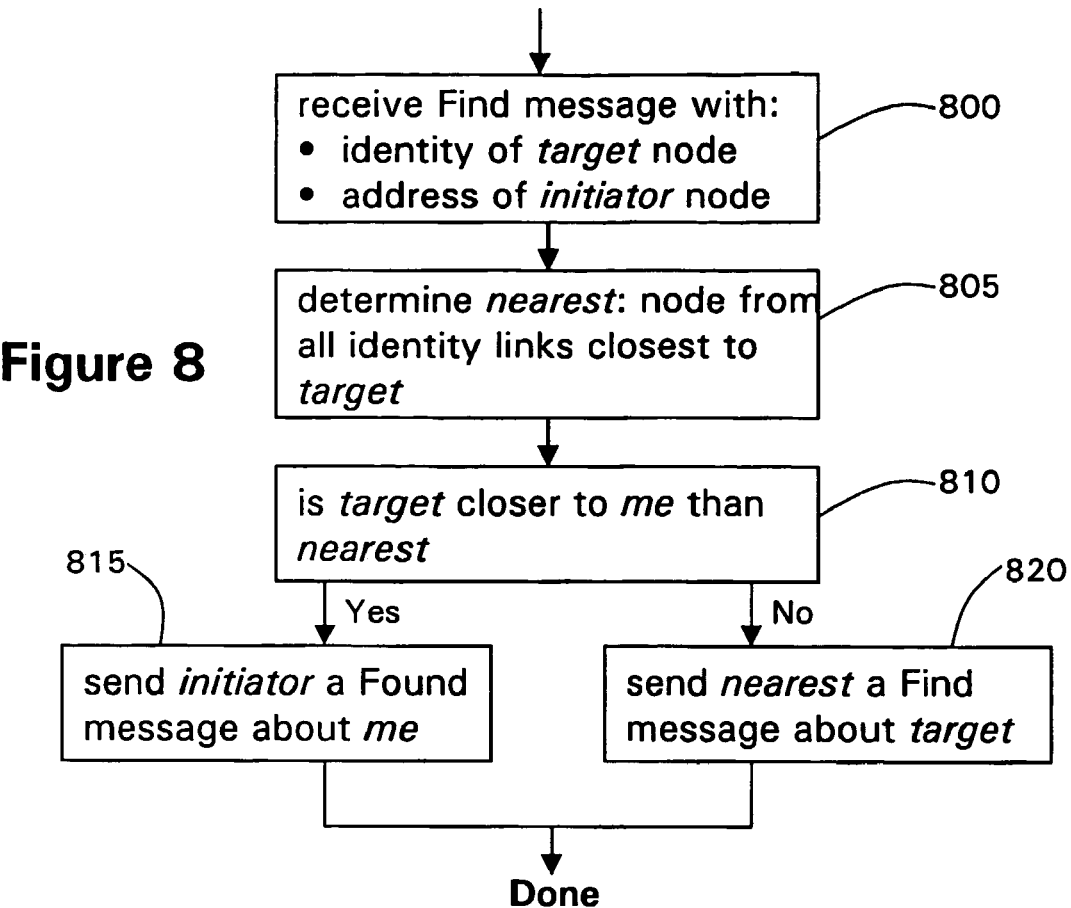
FIG. 8 is a flow chart of steps taken by nodes in handling incoming "FIND" messages.

FIG. 8 shows how each node 100 handles incoming "FIND" messages. In principle, the receiving node 100 looks for a node which is closer than itself to the target node identified in the "FIND" message and, if successful, passes on the "FIND" message. If not successful, it returns its own address and ID. It does this by carrying out the following steps:

STEP 800: the node 100 receives a "FIND" message which contains the ID of a target node and the address of an initiating node;

STEP 805: the node 100 translates the ID of the target node into co-ordinates in ID space and calculates which, of all the links (nodes) it has recorded, both short and long range, is closest to the target node in ID space. The relevant node is designated "nearest node";

STEP 810: the node compares the distance between its own ID co-ordinates and the target node's with the distance between the ID co-ordinates of "nearest node" and the target node's.

STEP 815: if the distance between its own co-ordinates and the target node's is less, the node sends the initiating node, via the infrastructure 115, a "FOUND" message containing its own ID and address;

STEP 820: if the distance between the ID co-ordinates of "nearest node" and the target node's is less, the node forwards the "FIND" message to "nearest node".

"FIND" requests can thus be used by the system to "look up" the address of a target node 100 as follows:
1. A node initiates a find query by sending a "FIND" message containing a target identity.
2. The "FIND" message is repetitively passed to nodes identified by links in the identity network in ID space 200. At each step it is passed to a node that takes it closer (in ID space 200) to the target node.
3. This continues until a final node is identified for which no closer node can be found.
4. This final node then sends the initiating node a "FOUND" message about itself.

The address of the node returned in Step 815 is either that of one with the target identity, or one close to it in ID space 200. When the returned identity does not match the target identity, it may mean either that the target node does not exist in ID space 200 or that the identity network in ID space 200 is not sufficiently self-organised. "PUSH" and "PULL" updates are initiated by nodes periodically to improve the identity network and these are described below.

The network's SWN properties ensure that the average number of nodes that need to be contacted to satisfy a "FIND" request scales well with the total number of nodes 100 represented in ID space 200.

Executing a "PUSH" Update

Figure 9:
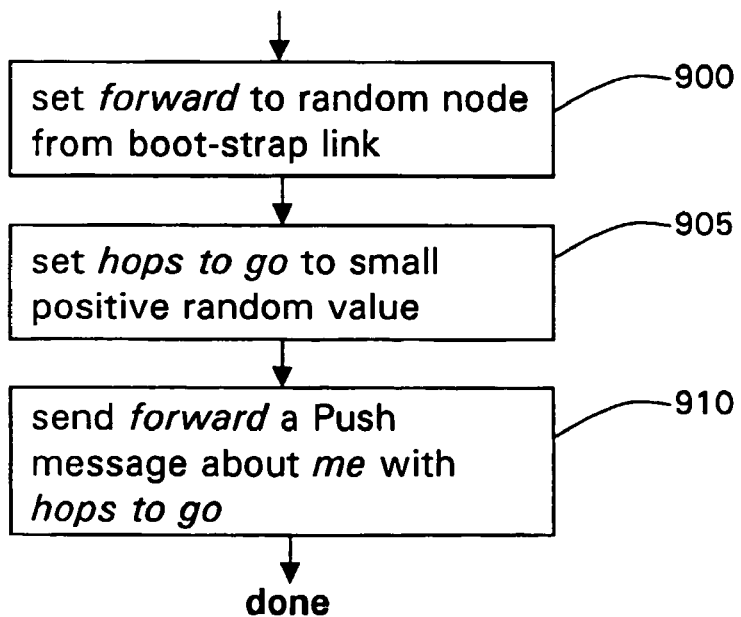
FIG. 9 is a flow chart of steps taken by nodes in initiating "PUSH" updates.
Figure 10:
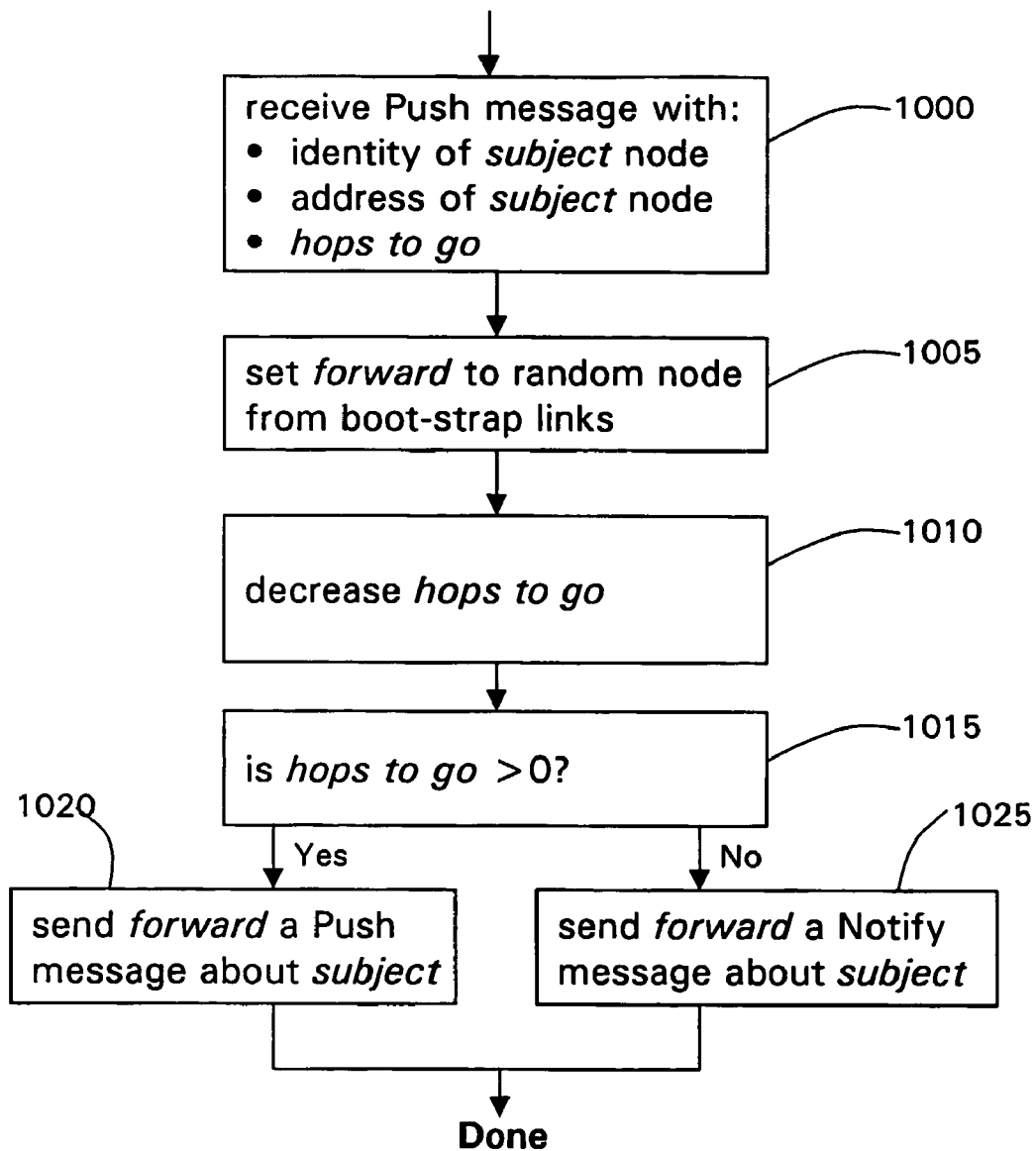
FIG. 10 is a flow chart of steps taken by nodes in handling incoming "PUSH" messages.
Figure 11:
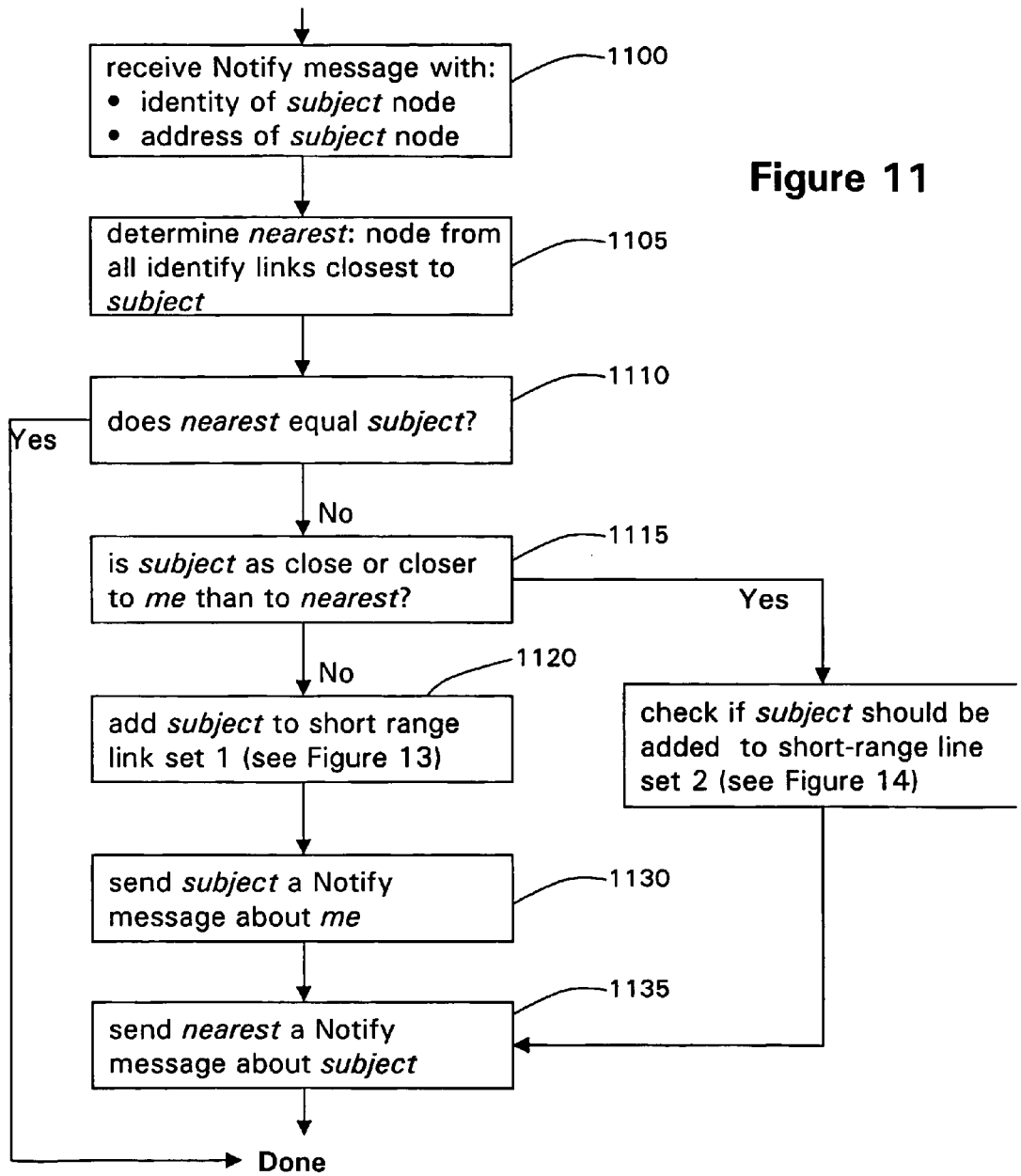
FIG. 11 is a flow chart of steps taken by nodes in handling incoming "NOTIFY" messages.

Each node can initiate "PUSH" updates. For instance, each node might start a "PUSH" update process periodically. In a "PUSH" update, a node sends out its own ID and address to a random series of nodes, setting a limit on the length of the series. The last node in the series sends a "NOTIFY" message back towards the initiating node. FIGS. 9, 10 and 11 show the various parts of this process.

FIG. 9 shows how a node 100 initiates a "PUSH" update, using the following steps: STEP 900: the node 100 selects a link randomly from amongst its bootstrap links and enters the address of the node identified by the selected link as a "FORWARD" address for a next message;

STEP 905: the node 100 enters a small positive random number for the field "number of hops to go" in the "PUSH" message;

STEP 910: enters its own ID and address as those of the "SUBJECT" node in the "PUSH" message and sends the "PUSH" message to the node at the "FORWARD" address, using the infrastructure 115.

FIGS. 10 and 11 show how short range links are updated. "PUSH" messages are used together with "NOTIFY" messages to update short range links. There are two phases in this updating. In a first phase, each node randomly forwards the "PUSH" message until the value in "number of hops to go" in the message as received is "1". If the value in "number of hops to go" is "1", the receiving node will start the second phase of the "PUSH" update by sending a "NOTIFY" message. In the second phase, the "NOTIFY" message is repetitively forwarded to nodes whose IDs are progressively closer to the subject node's in the ID space 200. If no node with a closer ID can be found, then if necessary the links for the last found node are updated. This is always the case when it would otherwise be unable to find the given subject node, for instance because it had no short or long range links yet established. The last found node then also sends additional "NOTIFY" messages to nodes that could potentially improve their link sets as well.

Referring to FIG. 10, the first phase of a "PUSH" update, dealing with incoming "PUSH" messages, involves the following steps:

STEP 1000: a node 100 receives a "PUSH" message. The "PUSH" message will contain the ID and address of an initiating node 100 as the "SUBJECT" node and will have a value in the field "number of hops to go";

STEP 1005: the receiving node 100 selects a link randomly from amongst its bootstrap links and enters the address of the node identified by the selected link as a "FORWARD" address for a next message;

STEPS 1010 and 1015: the receiving node 100 decreases the value in the field "number of hops to go" by 1 and checks whether the decreased value for "number of hops to go" is still greater than zero;

STEP 1020: if the decreased value is still greater than zero, the node 100 forwards the "PUSH" message to the "FORWARD" address which it has entered;

STEP 1025: if the value is zero, the node 100 instead enters the ID and address of the initiating node 100 (given in the received "PUSH" message) as the "SUBJECT" node in a "NOTIFY" message and sends the "NOTIFY" message to the "FORWARD" address which it has entered.

Referring to FIG. 11, the second phase of dealing with "PUSH" updates, dealing with "NOTIFY" messages, involves the following steps:

STEP 1100: a node receives a "NOTIFY" message containing the ID and address of a node 100 as the "SUBJECT" node;

STEP 1105: the receiving node 100 translates the ID of the "SUBJECT" node into coordinates in ID space and calculates which of the short range links it has recorded leads to a node ID whose co-ordinates are closest to those of the "SUBJECT" node in ID space. The relevant node is designated "nearest node";

STEP 1110: the receiving node 100 compares the ID and address of the "SUBJECT" node with those of the node designated "nearest node". If they are the same, the receiving node 100 already has a link in respect of the "SUBJECT" node and takes no further action;

STEP 1115: if they are not the same, the receiving node 100 compares the distances between its own co-ordinates and the co-ordinates for the "SUBJECT" node, and between its own co-ordinates and the co-ordinates for the "nearest node", in ID space;

If, at STEP 1115, the distance is found to be the same or less in respect of the "SUBJECT" node, the receiving node 100 adds the ID and address of the "SUBJECT" node as a link in its own short range link set ((step 1120) this process is further discussed below with reference to FIG. 13), sends a "NOTIFY" message to the "SUBJECT" node which contains the ID and address of the receiving node 100 (step 1130) and sends a "NOTIFY" message to the "nearest node" which contains the ID and address of the "SUBJECT" node (step 1135); If, at STEP 1115, the distance is found to be greater in respect of the "SUBJECT" node, the receiving node 100 checks whether it should add the ID and address of the "SUBJECT" node as a link in a second or higher short range link set ((step 1125) this process is further discussed below with reference to FIG. 14), and reverts to STEP 1135 in that it sends a "NOTIFY" message to the "nearest node" which contains the ID and address of the "SUBJECT" node.

The overall dynamics of a single "PUSH" update can be summarised as follows:
1. Each node periodically initiates a "PUSH" update by creating a "PUSH" message about itself.
2. The "PUSH" message is randomly forwarded along a series of nodes identified via the bootstrap network in ID space 200.
3. This continues until the "PUSH" message has passed a given number of nodes. By then, it has reached a random node out of a collection of nodes that are all distributed randomly in ID space 200.
4. This random node then creates a "NOTIFY" message containing the ID and address of the node that initiated the "PUSH" update.
5. The "NOTIFY" message is repetitively forwarded along links in the identity network. At each step it is passed to a node that takes it closer (in ID space 200) to the target node (the address of the "SUBJECT" node entered in step 1020).
6. This continues until a node is reached that does not link to a closer node.
7. This final node then checks if the "NOTIFY" message is about itself.
8. If this is not the case, it will update its short-range links accordingly.
9. It will then also send further "NOTIFY" messages to nodes that probably need to improve their short range links as well. This can result in additional, but typically short, "PUSH" activity as described in "5." above onwards.

Figure 13:
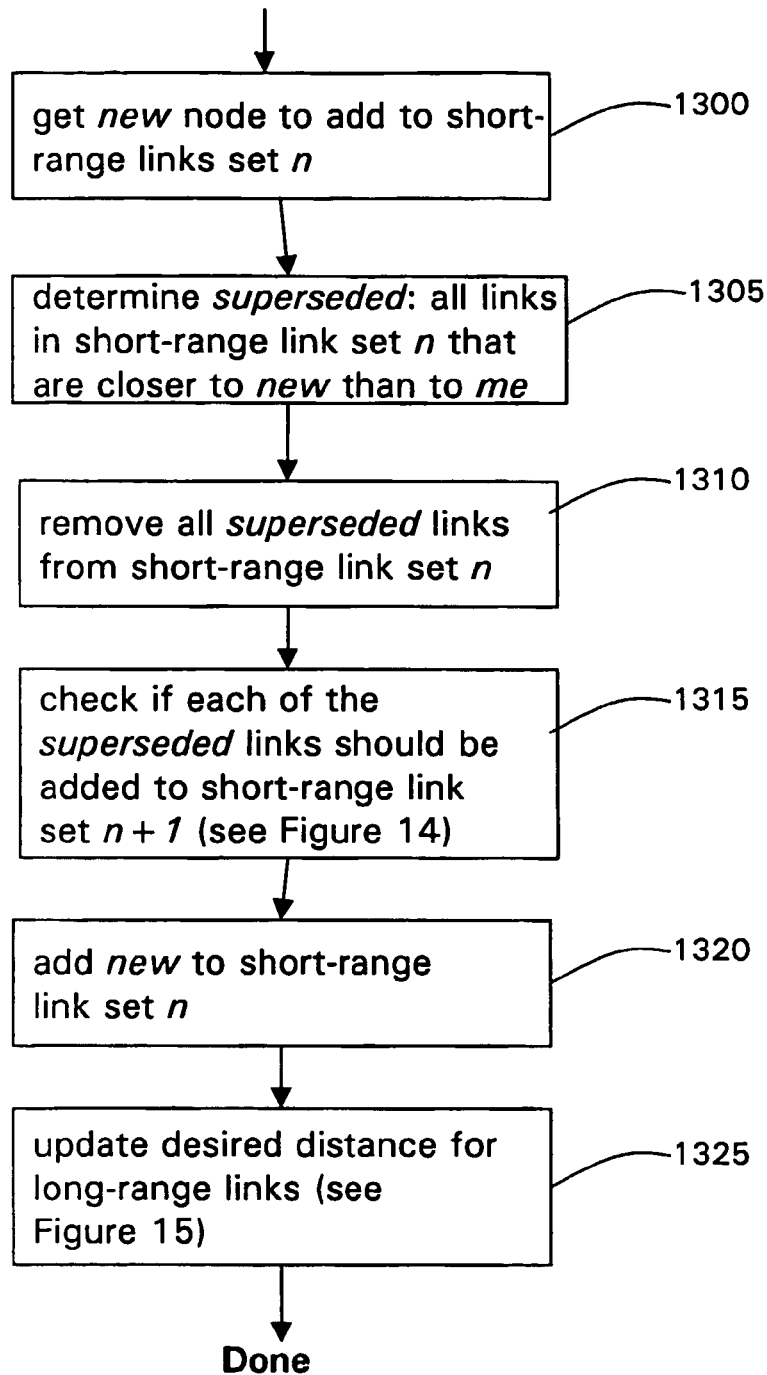
FIG. 13 is a flow chart of steps taken by nodes in adding nodes to short range link sets.
Figure 14:
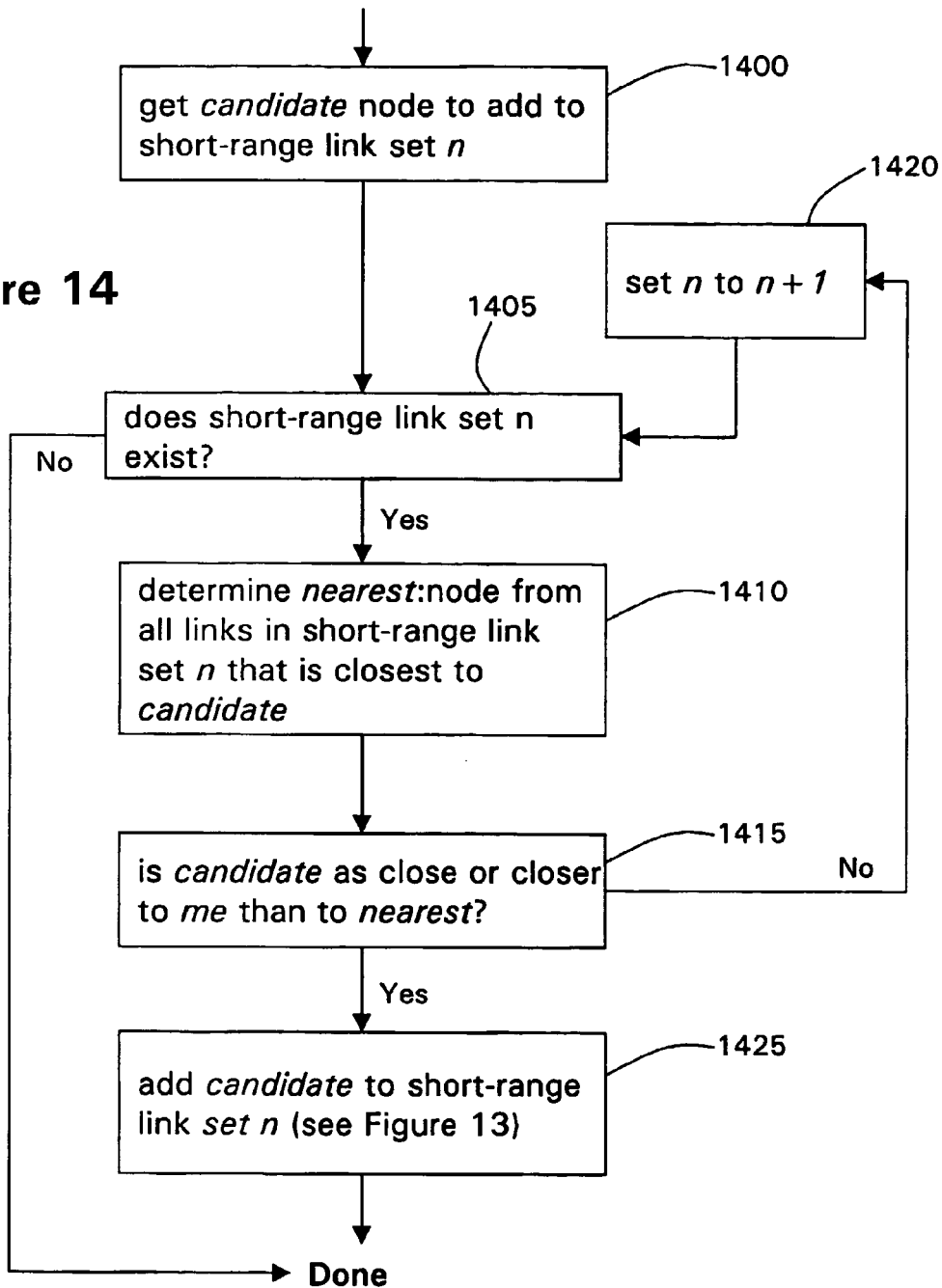
FIG. 14 is a flow chart of steps taken by nodes in checking whether a node should be added to a short range link set.
Figure 15:
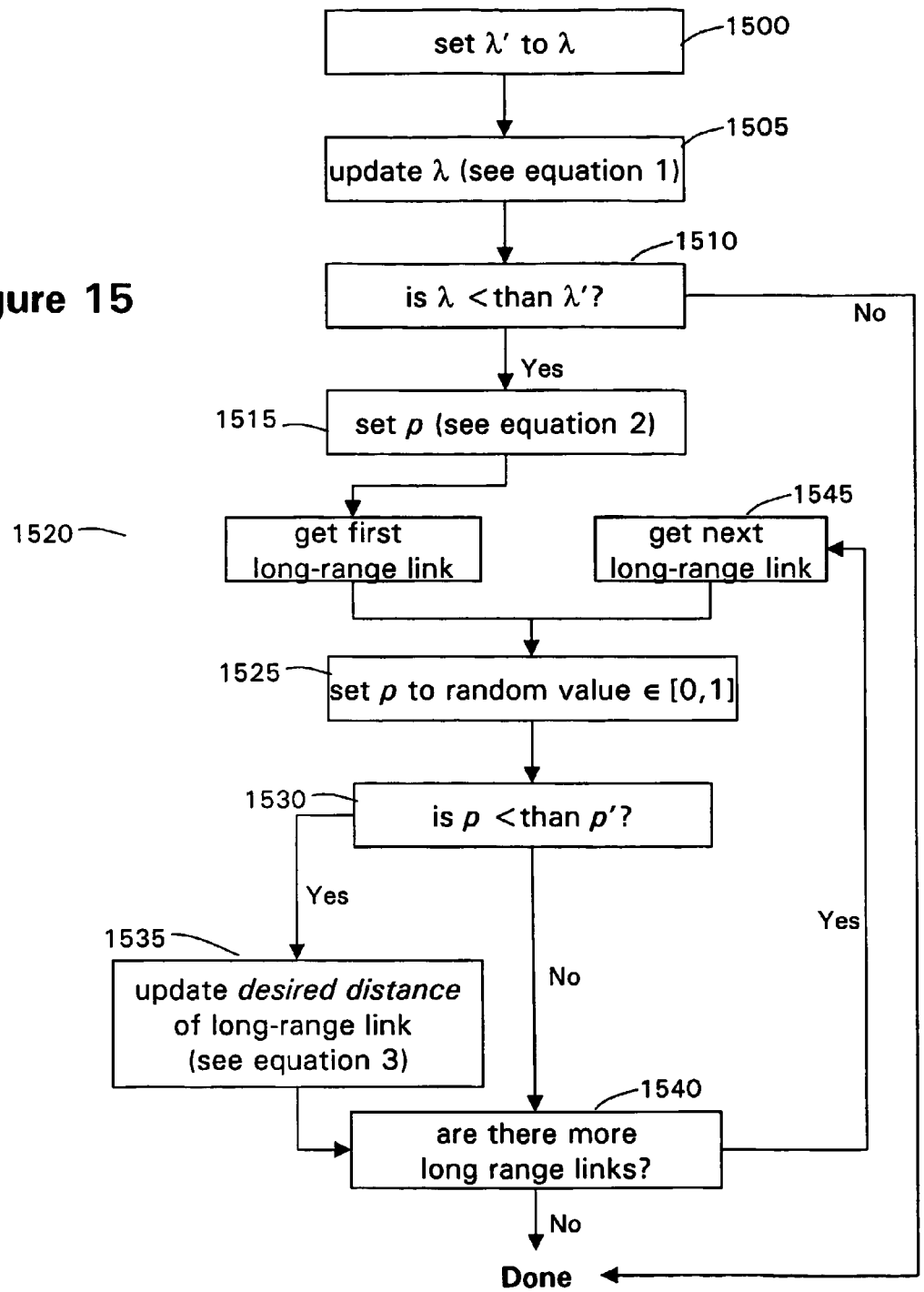
FIG. 15 is a flow chart of steps taken by nodes in updating desired distances for long range links after a new short range link has been added.

FIGS. 13, 14 and 15 show in detail how a node behaves when it updates its short-range identity links. Firstly, as shown in FIGS. 13 and 14, it will add the new link to its short-range links and remove all short-range links that are superseded by this link. Secondly, as shown in FIG. 15, it checks if it needs to update the desired distances of its long-range links.

Referring to FIG. 13, a node 100 may need to add a new link to its short range link sets for instance as a result of STEP 1120 in FIG. 11. Each node may have multiple short range link sets and these are referred to below as sets n, n+1 and so on. STEP 1300: the updating node 100 (that is, a node which is carrying out an update to its short range link set) has the ID and address of a node for a new link in the updating node's link set n;

STEP 1305: the updating node 100 identifies all links in the set n which are in respect of nodes which are closer to the new node than to the updating node. These identified links are to be superseded. To identify these links, the updating node calculates the distances between the ID co-ordinates for the new node and the ID co-ordinates for each of the nodes in its existing short range link set n respectively. It compares these distances with the distances between its own ID co-ordinates and the ID co-ordinates for each of the nodes in its existing short range link set n respectively;

STEP 1310: all links where the distance in relation to the new node is less than the distance in relation to the updating node are removed from the short range link set n;

STEP 1315: the updating node reviews whether any node whose link was removed at STEP 1310 should be added as a link to a different short range link set n+1 by using the process described below in relation to FIG. 14;

STEP 1320: the updating node adds a link for the new node to its short range link set n;

STEP 1325: lastly, the updating node updates its desired distances for long range links according to the process described below in relation to FIG. 15.

Referring to FIG. 14, an updating node 100 may have a candidate link to add to any of its short range link sets for instance as a result of STEP 1125 in FIG. 11. It will only add the candidate link to a set if the candidate node has ID co-ordinates which are closer in ID space 200 to those of the updating node than to those of any other node already in the set.

STEP 1400: the updating node 100 has the ID and address of a node for a candidate link in the updating node's short range link set n;

STEP 1405: the first step in this process is to check whether the short range link set n exists since this process is repeated automatically through multiple short range link sets of the updating node and may have already dealt with the last link set. If the short range link set n does not exist, the process simply terminates. If it does exist, the process moves on to STEP 1410;

STEP 1410: the updating node calculates which node already in the short range link set n has co-ordinates which are closest to those of the candidate node and designates it "nearest node";

STEP 1415: the updating node calculates whether the co-ordinates for the candidate node are as close or closer to the co-ordinates of the "nearest node" or to the co-ordinates for the updating node;

STEP 1420: if at STEP 1415, the co-ordinates for the candidate node are not found to be as close or closer to the co-ordinates for the updating node, the updating node simply sets n to N+1 and repeats STEPS 1405 onwards in respect of the new short range link set;

STEP 1425: if at STEP 1415, the co-ordinates for the candidate node are found to be as close or closer to the co-ordinates for the updating node, the updating node adds the ID and address of the candidate node as a link in its short range link set n, using the process described above in relation to FIG. 13.

FIGS. 11, 13, 14 and 15 all describe parts of the "PUSH" update mechanism and need to be considered together. For instance, it is not directly clear from FIG. 14 why for a given node N, there is no node M which will appear in more than one of node N's sets of short-range lists. This is only the case because in STEP 1110, FIG. 11 terminates as soon as "nearest node" is found to be the same as the "SUBJECT" node.

There is further discussion of multiple sets under the heading "Multiple Sets of Short Range Links" below, in particular their properties as implicitly determined by the update mechanism.

It is necessary to update the desired distances of long range links because the lower range of the desired distances for the node, λ, depends on its short-range links in accordance with the following equation:

$$\lambda = \alpha D \qquad \text{Equation 1}$$

where

D is the maximum distance in ID space 200 between the node and any node for which it has short-range links, and α is a parameter with a value near to "1".

The reason that the distances of a node's long-range links depend on its short-range links is that this range depends on the total number of nodes 100 having IDs in the ID space 200. When the number of nodes increases and the average distance between nearby nodes in ID space 200 decreases, some of the long-range links can have a shorter length. As the total number of nodes having IDs in the ID space 200 is unknown to every node, each node needs to control the distances of its long-range links indirectly. The way described herein is a simple but effective way of doing so.

When the distance range for long-range links changes, the distribution of the distances of long-range links should be consistent with the distribution given by Kleinberg, referred to on page 2. However, as there is some overhead associated with finding of the appropriate long-range links (see the description of the "PULL" update mechanism in relation to FIG. 12), the algorithm used by the nodes is designed to minimise the need to update the long-range links. Whenever the distance range for long-range link changes, a node will only update as many links as it needs to get the desired distance distribution. More specifically, the proportion of long-range links that is updated is controlled by stochastically updating each link for a node 100 according to the following probability:

$$\rho = \frac{\log D_{max} - \log \lambda'}{\log D_{max} - \log \lambda} \quad \text{Equation 2}$$

Here $D_{max}$ is the maximum possible distance between any two identities, which can be calculated from the dimensionality of the ID space 200 and the length of the identity bit-string. The values $\lambda$ and $\lambda'$ are respectively a new lower bound on the desired distances for long-range links and its previous value.

Updating a long-range link involves changing its desired distance. The new desired distance, d, is randomly chosen from an interval that has been added to the distance range of long-range links:

$$d = 2^{\log 2\lambda + x(\log 2\lambda' - \log 2\lambda)} \quad \text{Equation 3}$$

Here x is a random value chosen uniformly from the range [0, 1]. Once again, the values $\lambda$ and $\lambda'$ are respectively a new lower bound on the desired distances for long-range links and its previous value. The equation has been chosen such that all long-range links are nearly uniformly distributed over all "distance scales", which is necessary to ensure that find queries execute efficiently when the total number of nodes is large.

Referring to FIG. 15, the process for updating the desired distances of long range links of a node 100 is as follows:

STEP 1500: a new lower bound on the desired distances for long-range links is to be chosen and its identifier is set to $\lambda$;

STEP 1505: The value of $\lambda$ is updated using Equation 1 above;

STEP 1510: if $\lambda$ does not show a decrease with respect to $\lambda'$, the process terminates. If $\lambda$ does show a decrease with respect to $\lambda'$, the process continues;

STEP 1515: the stochastic updating probability for long range links for the nodes 100 (" ") is set using Equation 2 above;

STEP 1520: a first long range link for the node 100 is selected;

STEPS 1525 and 1530: it is necessary to apply the probability for updating links given by "ρ" so that only the correct proportion is updated. This is done by taking a parameter "p", giving "p" a random value in the range from 0 to 1 and evaluating whether it falls below "ρ". If it does, the process continues for the selected link. If it does not, the link under consideration is dropped and a fresh link brought into consideration (STEP 1545);

STEP 1535: if the random parameter was below "ρ", the desired distance of the link under consideration is updated using Equation 3 above;

STEP 1540: a check is made whether there are more links not yet considered for the node 100. If there are, a new link is brought into consideration (STEP 1545). Otherwise the process terminates.

Executing a "PULL" Update

Figure 12:
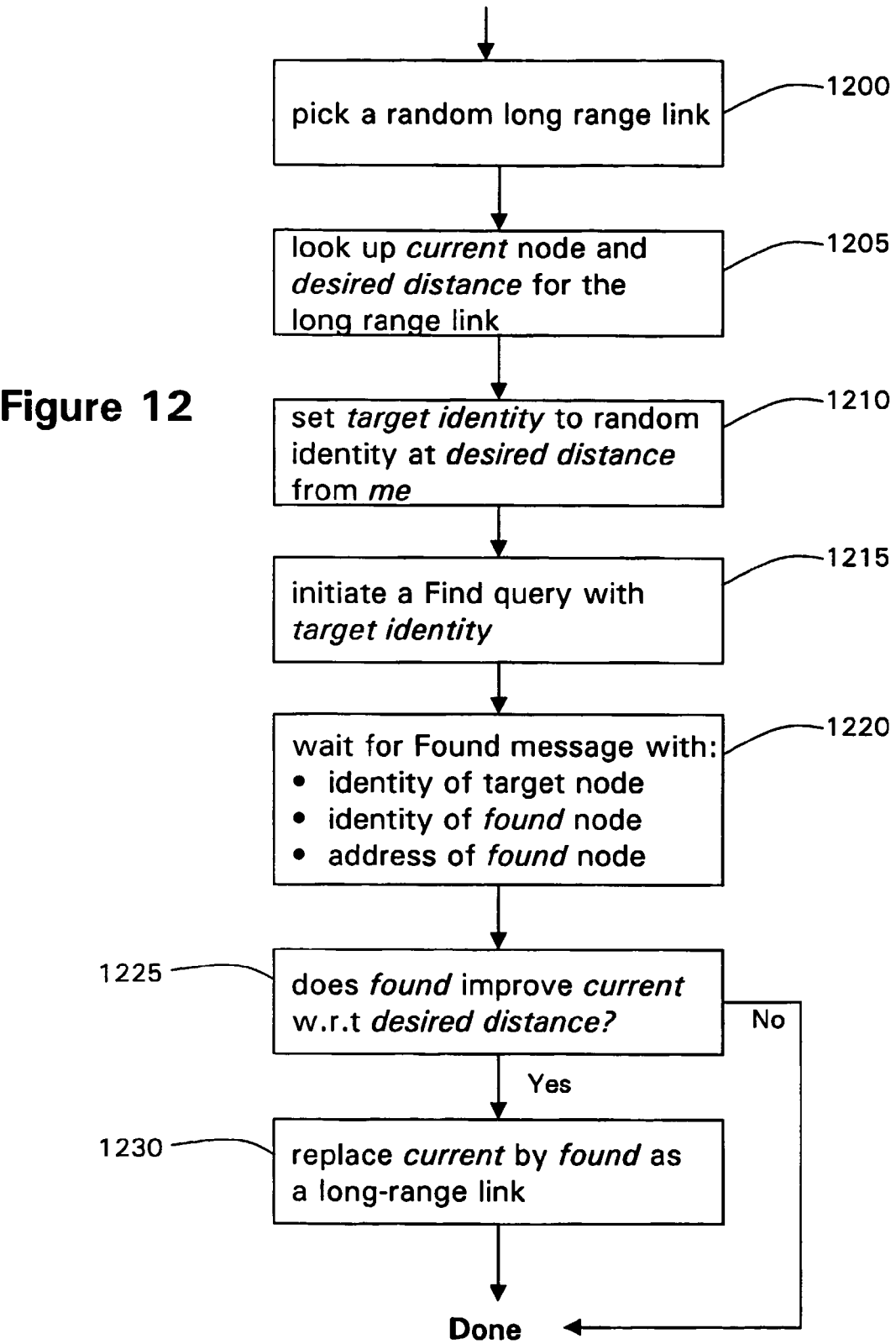
FIG. 12 is a flow chart of steps taken by nodes in initiating and completing "PULL" updates.

Referring to FIG. 12, as well as "PUSH" updates, each node 100 also actively initiates "PULL" updates. In one embodiment, each node initiates "PULL" updates periodically. FIG. 12 shows how a node initiates and completes a "PULL" update. It selects a long-range link, which it then tries to improve. This means finding a node whose identity is at a distance that is closer to a desired distance "d" for the long-range link, where d may preferably be determined from Equation 3. It does so by randomly generating an identity at the desired distance, and issuing a "FIND" request to find a node with an identity at a similar distance.

FIG. 12 shows the steps in the relevant process as follows:

STEP 1200: a node 100 selects a random long range link from its set of long-range links;

STEP 1205: the node 100 will have the ID and address of a particular node stored against the randomly selected long range link (selected at step 1200). It will also have a current desired distance "d" for the long range link, calculated using Equation 3 above. The desired distance "d" for the link has potentially changed since the ID and address of the particular node were stored and the reason for updating the link data is that the desired distance "d" may have diverged significantly from the distance of the currently logged node's ID. Even when the desired distance "d" has not changed since the last "PULL" update for this link, the actual distance of the node may not be very close to the desired distance. In particular where the identity network is in the initial stages of self-organisation, multiple attempts may be required to find a node at a given distance. In STEP 1205, the node 100 therefore retrieves data corresponding to the node currently logged against the randomly selected link together with the current desired distance "d" for the link;

STEP 1210: the node 100 creates an artificial target identity, where "artificial target identity" refers to an identity other than that of a known existing node, whose co-ordinates are at the current desired distance "d" for the link under investigation;

STEP 1215: the node initiates a "FIND" request, using the artificial target ID and its own address as content in the "FIND" request;

STEP 1220: the node 100 awaits a "FOUND" message in respect of its "FIND" request. The "FOUND" message will contain the artificial target ID plus the ID and address of a responding node which may actually have the target ID or may have an ID close to it in ID space 200, in accordance with the process shown in FIG. 8;

STEPS 1225 and 1230: if the distance for the co-ordinates of the responding node are closer to the desired distance for the link, the node 100 will substitute the ID and address of the responding node in place of those of the node previously logged against the long range link under investigation.

The overall dynamics of a single "PULL" update can be summarised as follows:

1. Each node periodically initiates a "PULL" update by randomly selecting one of its long-range links.
2. It looks up the desired distance for this link and randomly generates an identity at this distance.
3. It then creates a "FIND" message with the random identity as a target.
4. The "FIND" message then propagates along the network as described in the Section under the heading "Executing a "FIND" request to support a node lookup" above.
5. Eventually, the node will receive a Found message about a node which has, or has an identity close to, the target identity.
6. If this new node improves the existing long-range link (ie it is closer to the desired distance than existing links are), it will be used to replace the node data currently stored in the long-range link set.

Bootstrap Links

A minimum number of bootstrap links that are required to randomly forward a "PUSH" message is two per node; preferably there are more. With an increasing number of bootstrap links, fewer hops are needed to forward a "PUSH" message to get it to a sufficiently random node. As a rough guide, four bootstrap links per node has been found to be acceptable; however, when the nodes are not constantly accessible, more bootstrap links may be required. The skilled addressee will appreciate that the optimal number of nodes depends on various characteristics of the system in which embodiments are implemented. The skilled addressee will recognise that these characteristics may include available memory of each node, frequency with which nodes become unaccessible and how much (communication) overhead is associated with finding a substitute node for a link that has become unaccessible. The skilled addressee will also appreciate that there is a cut-off to the number of bootstrap links that are required, so that adding additional bootstrap links beyond this cut-off will not significantly improve the self-organisation process.

In addition, the bootstrap links should fully connect the nodes. For example, if there are two sets of nodes A and B, there should always be at least a single bootstrap link between a node in set A and a node in set B. If this is not the case, it will be impossible for short-range and long-range links to form between nodes in set A and set B, which means that it is impossible to find any node in set B from any node in set A (and vice versa). In practice, when bootstrap links are chosen to be sufficiently random, this is unlikely to happen. If there is not a single bootstrap link between set A and set B, a single bootstrap link can explicitly be added so that both sets of nodes are connected.

In one arrangement, most bootstrap links can be initialised to nodes that are physically close, in order to minimise message delays. In addition, or as an alternative, each node can have one or two bootstrap links per node which link to other nodes in the network in a random or partially random way.

Handling Node Failure

The overall design of the current system already makes it fairly robust to failure. If a small proportion of the nodes fail, most "FIND" requests will still be successful. However, the system described above does explicitly provide a mechanism for node failure. Possible ways of doing so include:

Acknowledge receipt of messages. In addition to the address and ID information that is included in FIND, PUSH and NOTIFY messages (described above), a node that sends a FIND, PUSH or NOTIFY message also sets a flag indicating that it requires the receiving node to send an acknowledgement packet (hereinafter referred to as an "ACK" message) on receipt of the message. Thus nodes are equipped with means for checking incoming messages to see whether the acknowledgement flag has been set, and in the event that it has been set, to send an ACK message to the sending node.

The system uses ACK messages to check whether the short-range, bootstrap and long-range links are currently valid. If the sending node fails to receive an ACK message this is an indication that the link is broken (i.e. the destination node does not exist anymore or it cannot be reached).

However, links should not always be replaced if a single ACK message is not received within a given time period. For instance, when an unreliable message passing is used (e.g. UDP), the fact that an ACK message is not received may simply be a result of the message passing mechanism rather than indicative of a failed link. In order to differentiate between unreliable message passing and link failure, the sending node monitors the number of packets sent to a link and the number of ACK messages received therefrom. If several consecutive messages are sent to a link and no ACK messages are received therefrom, the sending node can delete the link from its list.

In order to track the correlation between messages sent and ACK messages received, for each of the short-range, bootstrap and long-range links, a node stores data identifying, e.g., a time at which the last message was sent for which no ACK message has yet been received, and how many ACK message failures have occurred so far.

These ACK messages give an indication of transmission characteristics of a link: the average delay between sending the original message and receiving the ACK message is a good indication of the link delay; and the ratio of messages sent across a link versus ACK messages received gives an indication of the reliability of a link.

Thus, receipt of an ACK message, or lack thereof, indicates the status of a communications link between the sending node and the node to which a message has been sent.

In the event of failure, the sending node may carry out one of the following three procedures:

Retry sending the message along a different link. In the case of "FIND" messages, for instance, a node could always retry sending the message along a different link when it has other links that are closer to the target. Furthermore, it is also possible to allow the "FIND" message to "back-track" occasionally. It would then seem best to limit the number of times this can be done by associating a back-track counter with the message.

Replace failed links as soon as possible. Nodes can also mark failed links accordingly so that they can be identified for replacement. A node can temporarily increase its "PUSH" update activity to speed up the process.

Use multiple sets of short-range links. Instead of allowing each node to maintain a single set of short-range links, it is also possible for each node to maintain several sets of short-range links. Unless the link that failed was the target node, a node would always have one or more other suitable links. Not only does this make the system more robust, it also lowers the number of messages that are required to handle "FIND" requests. A drawback is, of course, that each node needs to maintain more links. This not only increases the memory required by each node, but more significantly, also incurs more overhead when nodes fail and links need to be adaptively updated. Multiple sets of short range links are further discussed below under the heading "Multiple Sets of Short Range Links".

FIG. 15 and the associated description show how a node can update its long-range links when the distance range increases. Similarly, when nodes fail or are withdrawn from the system, the total number of nodes typically decreases, and the node can update its long-range links in accordance with the method shown in FIG. 15.

Handling Node Address Changes

So far, it has been assumed that the addresses of all nodes remain fixed. However, in many applications it is preferable that nodes are able to change their network address, eg as they physically move in the network. Ideally, when the address of a node changes, the node would notify the change to all nodes that link to it. However, this cannot easily be done, as links are not necessarily mutual. Some short range links are unidirectional and long-range links are typically always unidirectional.

An efficient way of updating all affected short-range links would be by broadcasting a ChangeOfAddress message along the short-range links. The message would have a "hops to go" associated with it to limit its reach. The extent of the broadcast could be fairly small and still allow the updating of all affected short-range links because the nodes are highly connected. The initial value of "hops to go" is independent of the total number of nodes and is dependent on the dimensionality of the ID space 200 and the number of short-range link sets that each node maintains.

When a node discovers that one of its long-range links is broken, it is sufficient if it tries to replace it by another node at a similar distance. It would be difficult to update all relevant long-range links of an address change, and in any event, there is no real motivation to do so, as long-range links are not essential to handle "FIND" requests successfully.

Multiple Sets of Short Range Links

Embodiments of the present invention can work with a single short-range link set for each node. However, maintaining multiple sets of short-range links for the nodes has significant performance benefits. It not only makes the system more robust to node failures but, if there is more than one set of links, it can also significantly reduce the number of hops needed to find a node as the links in the "higher" short range link sets (defined below) tend to be longer.

The composition of a set of short-range links is implicitly determined by the rules that control when to add and remove a link. For instance, as described above with reference to FIG. 8, a link for a node is added to a set for node N, when its distance to node N is shorter than, or equal to, all distances to the current nodes in the short-range link set for node N. When there are multiple short-range sets, these can be organised as "higher" and "lower" sets. This is used to establish precedence between multiple short range sets. This means that the lowest short-range set for node N typically contains nodes that are closer to N than nodes in any of the higher short-range sets.

A node is added to a "higher" short-range link set if it is a node that is higher than node N, and it is added to a "lower" short-range link set if it is lower than node N.

Thus when creating multiple sets of short-range links, an additional constraint can be that a node can only be added to a higher short-range set when it is not in any of the lower short-range sets. This can be seen for instance in the flow chart of FIG. 13 where superseded links are reconsidered for higher short range link sets. That is, a node is removed from a set for node N, when it is found to be closer to (at least) one other node in the short-range set than it is to N itself.

A short-range set for node N can be termed "perfect" when for any node M (not equal to N), there is a node L in N's short-range set such that distance(L,M)<distance(L,N). In other words, for any "FIND" request, N can always find a node in its short-range set that takes the request closer to the target node.

In the case of multiple short-range sets, a short-range-set [n] for node N can be termed "perfect" when, for any node M (not equal to N and not in any short-range-set[m], where m<n), there is a node L in N's short-range-set [n] such that distance(L,M)<distance(L,N).

The above rules control when to add/remove nodes and every short-range link set will stabilise when the collection of nodes itself does not change. However, the current short-range sets for a node N cannot be wholly predicted since they are affected by the order in which nodes receive notifications about other nodes, which depends on the stochastic push update process and the order in which nodes are added to the system. For example, in a one-dimensional 1D space 200, with the following nodes (referred to here by their co-ordinate in identity space):

1, 4, 6, 9, 14, 15, 16, 20 the following are valid short-range sets for node 9:

(6,14): 6 and 14 are both closest to 9

(4,14): because 6 is closer to 4 than it is to 9

(6,15): once again, distance(14,15)<distance(9,15)

(6,16)

(4,15)

(4,16)

In the context of lower and higher short-range link sets:

(4,15) would be a valid "lower" short-range set for node 9, (6,14) would then be a valid "higher" short-range set for node 9.

Although somewhat unlikely, a possible scenario in which this could occur is as follows:

Starting state:
  lower short-range set, s1=( )
  higher short-range set, s2=( )

Node 9 receives notification about Node 4:
  s1 has first choice, and accepts it: s1=(4)

Node 9 receives notification about Node 15:
  s1 has first choice, and accepts it (because no node in s1 is closer to 15 than 9 Itself): s1=(4, 15)

Node 9 receives notification about Node 6:
  s1 has first choice, but rejects it (because 4 in s1 is already closer to 6 than it is to 9)
  s2 now has second choice, and accepts it: s2=(6)

Node 9 receives notification about Node 14:
  s1 has first choice, but rejects it
  s2 now has second choice, and accepts it: s2=(6,14)

So the end result is that the nodes in s2, are actually closer to node 9 than the nodes in s1. However, in practice this is unlikely and the nodes in the higher short-range sets are typically progressively further away from node 9.

FIGS. 6a, 6b and 7 show screenshots of ID space 200 where nodes have multiple short range link sets. FIG. 6a shows two short range link sets for each node identifier 100 superimposed on one another and FIG. 6b shows the same array of node identifiers 100 but only shows the lowest short range link set. FIG. 7 on the other hand shows two short-range link sets but for only selected node identifiers 100. FIGS. 6a, 6b and 7 differ from FIGS. 4 and 5 in that there are no "FIND" request paths 400 shown. FIGS. 6a, 6b and 7 show only the link sets between node identifiers 100 which a "FIND" request path 400 might use.

Reference is made below to "node identifiers" 100 as shown on FIGS. 6a, 6b and 7. To be accurate, what actually appears in ID space 200 at the end of the links 205 is the position of the pair of co-ordinates in ID space 200 which have been calculated from the identifier for the relevant node 100. Each "link" 205 is a visual representation of whether or not the nodes whose identifiers' co-ordinates mark the ends of the link have access to the ID and network address for the node indicated at the other end of the link.

The following table shows the relationship between link representation and link qualities:

|  | Lower Short Range Link Set | Higher Short Range Link Set |
| --- | --- | --- |
| Mutual | Both parts solid | Both parts dashed |
| One way | Part solid, part dotted | Part dashed, part dot-dashed |

Referring to FIG. 6a, having two short range link sets for each node identifier 100 produces two identity networks in ID space 200. These two networks produce several different types of link between pairs of node identifiers 100. In FIG. 6a, five node identifiers 100 have been highlighted as white circles and the links therebetween are shown as variously dotted, dashed and solid lines. All the other nodes and links shown have a similar character but the ones highlighted have been selected as representative for explanation purposes.

Each link is represented in two parts to show whether the links are mutual or one-way. The links are part of a lower and a higher short range link set respectively. Links 205 shown as solid or dotted lines indicate links of the lower short range set. Links 205 shown as dashed or dot-dashed indicate links of the higher short range set.

Considering the links as shown in FIG. 6a, the types of links indicate the following node relationships:

Link 205a, 205b (solid/dotted therefore lower range set)—this link is one way. Node 100a has the ID and network address for node 100b but node 100b does not have the ID and network address for node 100a;

Link 205c, 205d (dashed/dot-dashed therefore higher range set)—this link is one way. Node 100a has the ID and network address for node 100d but node 100d does not have the ID and network address for node 100a;

Link 205e (solid therefore lower range set)—this link is mutual. Nodes 100a, 100e each have the ID and network address of the other;

Link 205f, 205g (solid/dashed therefore partly lower range set and partly higher range set)—this link is an interesting combination of the lower and higher range sets. Node 100g has the ID and network address for node 100e in a lower range link set. Node 100e does not have the ID and network address for node 100g in the lower range link set but does in the higher range link set.

In FIG. 6b, the same node identifiers 100 are shown as in FIG. 6a but the higher range link set has been removed. Now the links indicate the following node relationships:

Link 205a, 205b (solid/dotted therefore lower range set)—this link is unchanged in relation to FIG. 6a;

Node identifier 100d-link 205c, 205d has been removed and node identifier 100d is no longer in a virtual network;

Link 205. (solid therefore lower range set)—this link is unchanged in relation to FIG. 6a;

Link 205f, 205g (solid/dotted therefore lower range set)—this link is now one way. Node 10g has the ID and network address for node 100e in a lower range link set. Node 100e does not have the ID and network address for node 100g in the lower range link set.

Referring to FIG. 7, where there are multiple sets of short range links for one or more node identifiers 100, the links of the lower set are generally, though not in all cases, between node identifiers 100 which are closer to each other than node identifiers 100 linked by links of the higher set. In FIG. 7, the lower short range link set has been emphasised by superimposed dotted lines. One of these, link 205l, has been referenced in the figure as an example. The higher short range link set has not been emphasised and one of these links, link 205h, has also been referenced in the figure as an example.

Minimising Network Traffic

The scalability of the system inherently reduces network traffic. In addition, the "PULL" and "PUSH" mechanisms described above can be controlled in such a way as to decrease the amount of traffic further. Some ways of doing this are as follows:

Selection of node for forwarding FIND messages. As described above with reference to FIG. 8, in a first embodiment (at step 805) a node 100 translates the ID of the target node into co-ordinates in ID space and calculates which, of all the links (nodes) it has recorded, both short and long range, is closest to the target node in ID space. The relevant node is designated "nearest node". Then, if the distance between the ID co-ordinates of "nearest node" and the target node's is less than the distance between the ID co-ordinates of the node 100, the node forwards 100 the "FIND" message to "nearest node" at step 820. As an alternative to identifying a node on the basis of proximity to the target node, the node could additionally take account of transmission characteristics between a potential "nearest" node and the node 100.

Accordingly, instead of identifying the "nearest" node, the node 100 could identify a plurality of nodes—e.g. those that are "close" to the target node in ID space. For example the node 100 could set a distance threshold, and all of the recorded nodes whose distance falls within the distance threshold could be identified as "close" to the target node. An example of such a distance threshold is the distance (in ID space) between the receiving node and the target node, so that any node that takes the message closer to the target node could be considered. The node 100 could then review the transmission characteristics between itself and each of the "close" nodes, and select one of these nodes on the basis both of the degree of proximity and transmission characteristics.

Typical transmission characteristics could include speed and robustness of communication links between the node and its short-range links. These characteristics can be identified via the receipt and processing of ACK messages, described above in the sub-section entitled "Acknowledge receipt of messages".

This selection could be based on the "rate of progress" for a message, which essentially represents the delay in transmission between nodes. The rate of progress for a message, which is received by node N, routed to node M, and ultimately needs to be routed to node having identity D is:

rate of progress(N,M,D)=(d(N,D)−d(M,D))/(d(N,D)*delay(N,M)) where "delay(N,M)" is the delay associated with the link from node N to node M, and d(N, D) is the distance in identity space between the identity D and the identity corresponding to node N.

For example, assume a node A receives a FIND message for a node having identity D, and that node A has links to respectively nodes B and C. Assume that delay(A, B)=50 ms and delay(A, C)=10 ms, and d(A, D)=0.60, d(A, B)=0.20 and d(A, C)=0.30. Then the rate of progress when the message is routed to B is: (0.60−0.20)/(0.60*0.05)=13, whereas the rate of progress when the message is routed to C is: (0.60−0.30)(0.60*0.01)=50. So this would indicate that although node B is closer to the node having identity D in identity space, in view of the time that is required to route the message, the message would reach the node having identity D more quickly if it were routed via node C.

A node could thus be selected on the basis of rate of progress. An alternative approach would be to stochastically select the next node according to the rate of progress, such that the nodes with a higher rate of progress are more likely to be selected. In this way the system may become more robust to malicious nodes.

This approach is beneficial in situations where a node has two (or more) links that are approximately the same distance from the target node, and where the node 100 may not want to forward the message to the closest node. For example, if one of the links represents a node on your own computer, and one is to a node at the other end of the world, clearly the message should be forwarded to the node on your own computer (as the objective is to maximise the progress in ID space, while minimising the delay associated with sending the message). In order to bias selection towards the physically distant node, the node 100 can use a criterion that takes account of the speed and robustness of the link.

Adaptively control "PULL" and "PUSH" update activity. As described above, "PULL" and "PUSH" updates are necessary to set up the identity network in the ID space 200. Once the identity network is of a certain quality and "FIND" requests are handled efficiently, the volume of "PULL" and "PUSH" update activities can be decreased to limit the network traffic. A node can never exactly know the extent to which its links can be improved, but it can form an estimate by monitoring the messages it processes. For example, it can calculate the ratio of the number of "PUSH" updates it has initiated and the number of times it has consequently improved its short-range links, which gives an indication of the quality of the short-range links. Nodes could adapt the number of updates that they initiate as a function of the perceived system load and the perceived quality of their links (ie the calculated ratio).

Bias long-range links to nodes that are physically close. The selection of long-range links is described above as being a function of the distance of their co-ordinates in ID space 200. However, when the desired distance for a link is large, there can be many nodes that are at a suitable distance (in ID space 200). In this case, it is preferable to bias the selection of long-range links as a function of proximity in the physical communication network, for instance to bias the selection towards those links for which communication time to the initiating node 100 is shortest. This could simply be achieved by taking into account the time it takes for a node to reply.

Have long-range links that are (mostly) mutual. In the system described above, a node does not know which other nodes are linked to it by means of a long-range link. In applications where addresses of nodes often change it may be worth having a process whereby long-range links can be updated efficiently. A simple and efficient approach would be allowing each node to maintain a set of shadow long-range links. Any time a node receives a message from a node along a long-range link (messages could have an additional flag to indicate whether this is the case), it could put the received message at the head of the shadow set. Whenever the set reaches a predetermined maximum size, the node at the tail would be removed. In this way, the memory needed would be controlled, and no extra messages need to be sent to maintain the shadow set. Whenever a node changes its address, it could notify all nodes in its shadow set.

Managing Traffic and Data Generated by the System in the Network

In an embodiment of the present invention, it is possible that there is more than one node on any platform element, such as a computer. In this case, each node could be assigned a separate port number. Alternatively, if the number of nodes is too large for each to be assigned a separate port number, any system message to that platform element could be sent to a system software daemon. Each node address for a node served by the daemon would then have a part to reach the daemon and an additional part to allow the daemon to forward the message to the appropriate node. Alternatively, the system daemon itself could be directly responsible for handling all messages for the nodes it represents.

It is not necessary that the nodes each have means for controlling the storage of data for use in an embodiment of the present invention. For instance, in the case where a system daemon or server handles the sending and receiving of messages for some of the nodes in the system, the daemon or server might control the storage of data on behalf of individual nodes. Each node might be allocated storage in a shared data store and the daemon or server might load and read data on the node's behalf. Although this arrangement is not fully distributed in the sense that every node in the communications network has exactly the same capabilities, such an approach can be efficient.

Duplicate Identities

In the above description, it has been assumed that all nodes have a unique identity. There are certain situations where it may be preferable for multiple nodes to share the same identity. There are various ways in which this could be achieved and the selection of a suitable approach is dependent on the situation. Some potential ways in which nodes might share the same identity are as follows:

Let "FIND" requests return any node with a given identity. This can be achieved fairly easily by a constraint such as:

"Do not allow nodes to link to nodes with exactly the same identity"

This constraint prevents loops in the identity network, which would cause problems when handling "FIND" requests.

Let "FIND" requests return several nodes with a given identity. In order to let a single "FIND" request return multiple nodes with a given identity, nodes could maintain one or more zero-range links, which are links to nodes with the same identity. These links can be set whenever a node receives a "NOTIFY" message about a node with the same ID as itself but different network address. These links could be used to find such other nodes with the same identity.

However, as the zero-range links are formed randomly, on receipt of a "NOTIFY" message, there is no efficient way to find all nodes with a given ID.

Centralisation

The system described above is a fully distributed system, without any centralisation. It may however be worthwhile to trade-off some of the robustness of distributed systems for the efficiency of a centralised and/or hierarchical approach. This may, for instance, be useful in a complex system with a high number of nodes. In this situation, at least some of the nodes could be designated "super nodes". These super nodes maintain a larger collection of links than non-super nodes.

The super nodes would act as specialised long range links. However, they would not be replaced in the way of long range links, to suit a change in desired distance. It would be possible to use a hierarchy of identity networks in ID space 200. The top network would contain the identities of relatively few nodes, these being the super nodes. These nodes would each have many "down links" to nodes whose identities appear in a "lower" identity network and have similar identities to their respective super node so that they appear relatively close to the super node in ID space 200. (References to "higher", "lower", "down links" and the like in this context arise because the identity networks have a hierarchical nature, the identity network for the super nodes being conceptually higher in the hierarchy than a network for non-super nodes.) Nodes in the "lower" networks would all maintain one or more "up links" to super nodes.

It is important that these super nodes can update their links efficiently. It is preferable that the links between super nodes and nodes in lower networks are mutual. They can then be used to let the super nodes keep track of address changes efficiently.

An arrangement using super nodes, as described above, would reduce the number of messages needed to handle "FIND" requests. On the other hand, robustness would be lower and the super nodes would require more processing power.

Examples of Contexts for Use of Embodiments of the Invention

Location Independent Naming Schemes

One type of application is where the location of nodes can change. Two examples are:

Peer-to-peer file storage application. Files may be moved around to exploit the available resources in an efficient way. Duplicates of each file may also or instead be stored at different locations to increase the reliability of the system. Embodiments of the invention can be used to retrieve files without prior knowledge of where they are stored. Each file in this environment would be a node.

Look up of mobile agents. In a mobile software agent environment a first agent may need to contact a second agent that appears to have moved since last contact. If the agents comprise nodes in an embodiment of the present invention, it becomes possible to contact the second agent.

Additional Modifications

The above description assumes that a node issues a "FIND" request in the event that it wants to communicate with a node for which it has no address (the so-called target node). This can be generalised as a transaction between the requesting and target node—e.g. Web Services transaction, HTTP get, Instant messaging conversation etc.

However, it may be the case that a node only wants a particular piece of information from a target node—for example some data such as a string, an integer or the like. In this situation, the requesting node does not need the network address, since it does not wish or need to carry out a transaction; it merely needs the information. Accordingly, in an alternative embodiment the requesting node includes, encapsulated in the FIND request, details of the information that it needs. When the FIND request reaches the target node, the target node unencapsulates the FIND message, identifies the information required, and retrieves it (if possible). Subsequently, the target node sends the retrieved information to the requesting node, either using the network address of the requesting node (thus over infrastructure 115) or by means of a "FOUND" message.

When the SWAN system is used solely for the purposes of retrieving data from a node, this alternative embodiment should be used, since the amount of network traffic is reduced by 50%.

Example Implementation of a SWAN System

A system that implements an embodiment of the invention is shown in FIGS. 16-19b. This system, which is called the DIET (Decentralised Information Ecosystem Technologies) platform, has been developed as part of a $5^{th}$ Framework project funded by the European Commission under the Future and Emerging Technologies area (European Commission under the Future and Emerging Technologies. Universal information ecosystems proactive initiative available, at April 2002, from website: ptth:\\www.cordis.lu\ist\fethome.htm, 1999). Usually a reference to a document on a website takes the form of a first part indicating the network delivery mechanism (e.g. http:// or ftp:// for the hypertext transfer protocol or file transfer protocol respectively) followed by the network address of the server (e.g. www.server 1.com) suffixed with the name of the file that is being requested. Note that, in the examples given, such names are, for typographical reasons, shown with the "//" replaced by "\\", and http is replaced with ptth.

Figure 16:
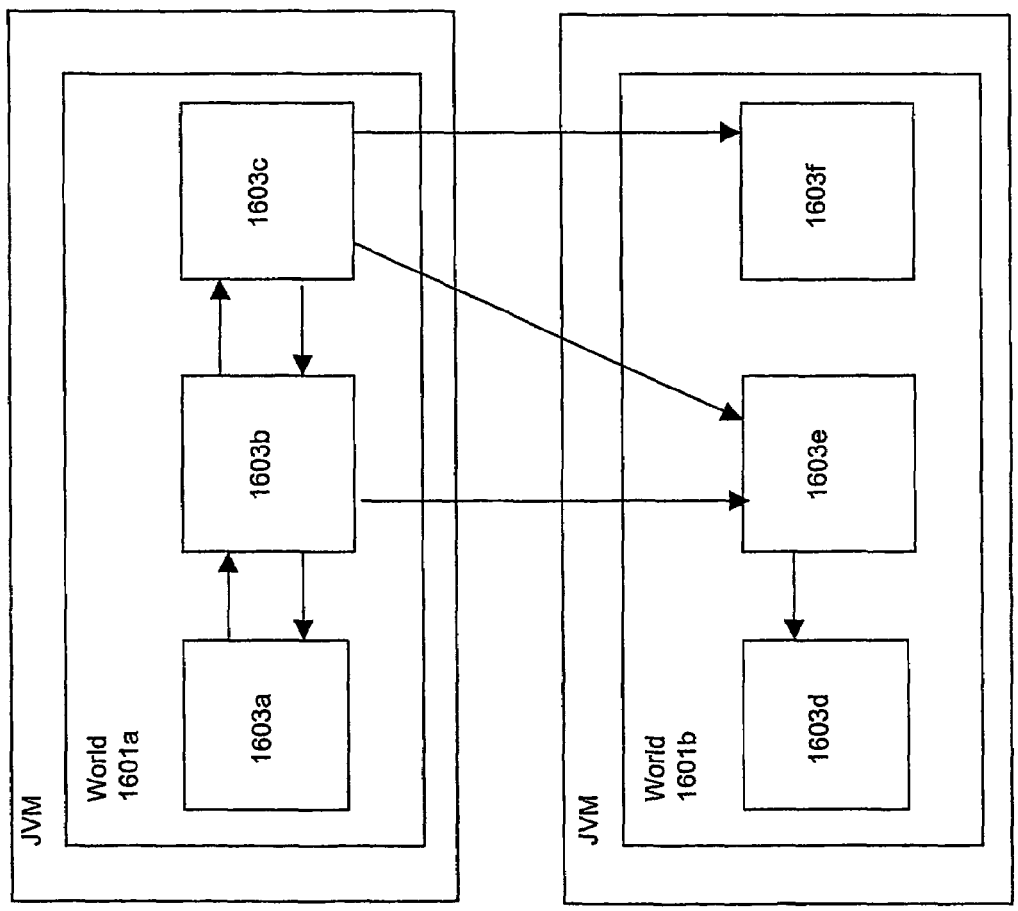
FIG. 16 is a schematic diagram of an environment within which an embodiment of the invention could operate.
Figure 17:
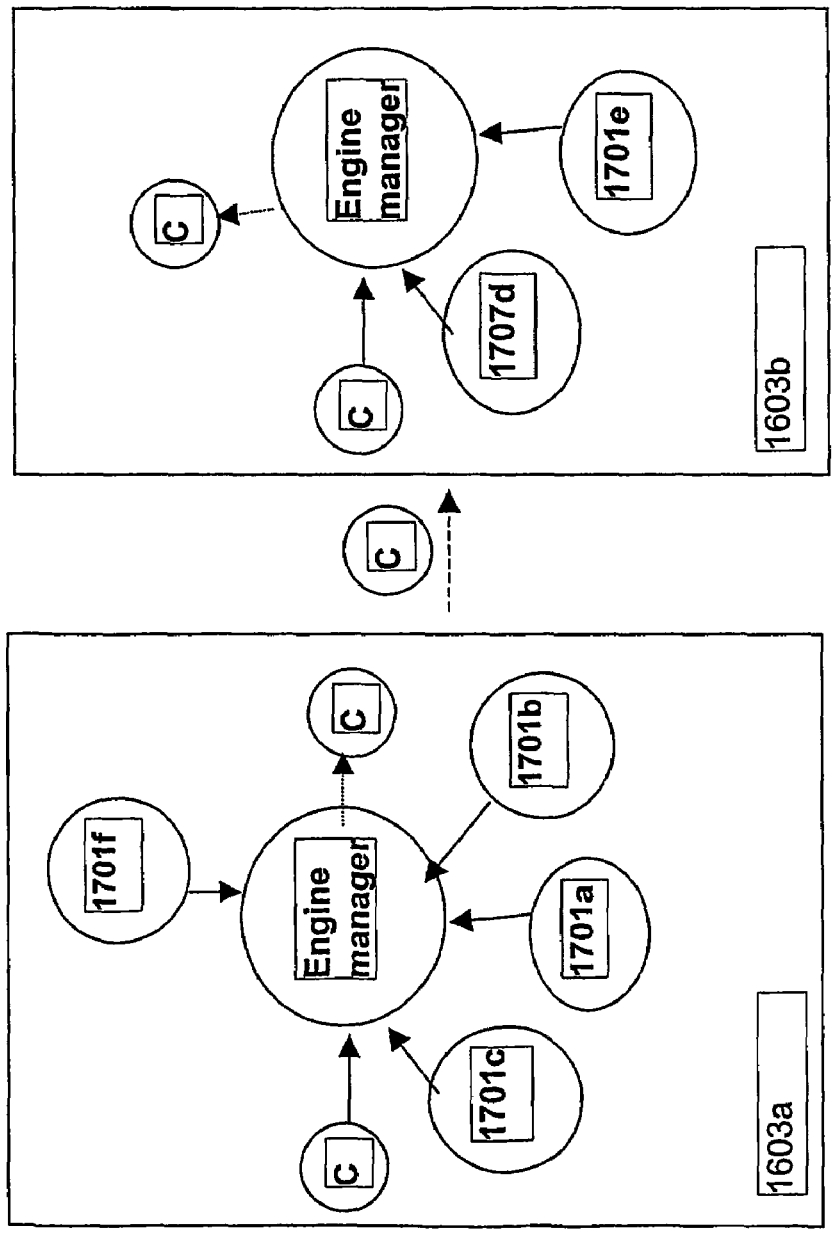
FIG. 17 is a schematic diagram showing the environment of FIG. 16 in more detail.

Referring to FIG. 16, the DIET system comprises one or more worlds 1601a, 1601b, each of which is located on a Java Virtual Machine (JVM) and has one or more environments 1603a, 1603b located therein. Each environment can be linked to one or more other environments 1603b, and, as shown in FIG. 17, one or more software agents 1701a, 1701b ... 1701f, C are located within an environment 1603a. Agents can migrate to other environments in response to a migration request that includes the address of the destination environment (in FIG. 17, such migrating agents are shown as carrier agents), while the neighbourhood links enable agents to migrate to the other environments 1603b at random. A particular feature of the DIET platform is that there is no need for a central registration of worlds 1601a, 1601b, so that the architecture is effectively peer-to-peer. For further information on the DIET platform the reader is referred to "Agents in Decentralised Information Ecosystems: the DIET Approach", in Proceedings of the AISB'01 Symposium on Information Agents for Electronic Commerce, authors P. Marrow et al., York, UK, 2001, pp 109-117.

In this particular example, a node 100 of the foregoing description is a service agent 1701a in the DIET system, and is implemented in the Java™ programming language. A service agent 1701a can have additional capabilities that are unrelated to SWAN address management. However, at the very least the service agent 1701a must either itself have SWAN processing capabilities, or interoperate with (a) modules that (has) have SWAN processing capabilities. Accordingly, referring to FIG. 18, in one arrangement each agent 1701a implements a context interface 1801 and is in operative association with a protocol engine 1803, which itself implements an engine interface 1805 (a brief description of Interfaces is presented in Appendix 1). The service agent 1701*a* has a reference to the protocol engine 1803, which, as will be appreciated by one skilled in the art, means that the service agent 1701*a* can invoke methods of the engine interface 1805.

The interfaces in the present example are defined as follows:

engine interface 1805

```
interface SwanEngine {
    /* Sets up and activates the object that implements the
engine interface 1805, e.g. the protocol engine 1803.
    */
    void activate(SwanIdentity id, SwanEngineContext context,
        SwanAddress internal address,
        SwanAddress external-address);
```

The method "activate" provides access to the context interface 1801 for objects implementing the engine interface 1805, and thus enables the protocol engine 1803 to access the methods in the context interface 1801.

```
    /* Provides the object that implements the engine interface
1805, e.g. the protocol engine 1803 with an additional bootstrap link.
    */
    void addBootstrapLink(SwanAddress address);
    /* Handles incoming messages.
    */
    void handleMessage(SwanMessage msg);
```

The method "handlemessage" is configured to process any type of SWAN message: PUSH, PULL, NOTIFY, FOUND, and may, for example, comprise a series of "if—then" statements.

```
    /* Initiates a Find query.
    */
    void find(SwanIdentity target_id);
}
```

The protocol engine 1803 implements these methods.

context interface 1801

```
interface SwanEngineContext {
    /* The protocol engine has access to these methods by
virtue of method "activate" in the engine interface definition
above.
    */
    /* SendMessage is called by the protocol engine to trigger
the object that implements the context interface 1801 (e.g.
service agent 1701a) to send outgoing SWAN messages.
    */
    void sendMessage(SwanMessage msg);
    /* Called by the protocol engine to signal it wants the object
that implements the context interface 1801 (e.g. the service
agent 1701a) to request a bootstrap link.
    */
    void requestBootstrapLink( );
    /* Called by the protocol engine to trigger the result of a
Find query to be returned to the object that implements the
context interface 1801 (e.g. the agent service 1701a)
    */
    void findDone(Swanidentity target_id, SwanIdentity subject_id,
        SwanAddress subject_address);
}
```

In the configuration shown in FIG. 18, service agent 1701*a* is responsible for sending and receiving messages, while the content of, and trigger for, such messages is controlled by the protocol engine 1803. This allows the service agent 1701*a* to select a delivery mechanism (e.g. depending on type of environment) that is best suited to the constraints of the delivery process. To enable the service agent 1701*a* to distinguish SWAN messages from other types of messages that it may receive, one of the following approaches is required:

- either the service agents have two addresses associated therewith, one associated with SWAN messages and the other associated with other types of messages (of course the other types of messages could themselves by identifiable by different addresses). All of the agents know about the SWAN address of other agents, so that, when sending a SWAN message to an agent, the SWAN address corresponding thereto is used as destination address.
- or the header of messages received by an agent can include a portion that identifies the message as a SWAN message (having examined the header of a received packet, the service agent 1701*a* can identify the SWAN message, extract the data from the received packet and forward that to the protocol engine 1803);
- or the service agents 1701*a* can be arranged to identify the sender of the message (e.g. by type of agent that transported the message), and, if the sender identity is of the SWAN type, forward the message to the protocol engine 1803.

Messages are passed between the protocol engine 1803 and service agent 1701*a* by means of their implemented interface methods. More specifically, the context interface 1801 is used by the protocol engine 1803 to enable the protocol engine 1803 to interact with whichever object uses the protocol engine 1803 (e.g. in FIG. 18, the service agent 1701*a*). So when the protocol engine 1803 needs to send a message, it calls the "sendMessage" method on the service agent 1701*a* that it is provided with when the protocol engine 1803 is activated (by virtue of the "activate" method in the engine interface 1805).

FIG. 18 shows an example of the interaction between these various components, specifically in respect of a PUSH message received by the service agent 1701*a*:

At step S18.1, the service agent 1701*a* receives a PUSH message, e.g. from another service agent 1701*d*, and calls S18.2 method "handleMessage", causing the protocol engine 1803 to process S1 8.3 the message.

Having processed the message, the protocol engine 1803 calls S18.4 method sendMessage, which causes the service agent 1701*a* to send S18.5 a NOTIFY message to another service agent 1701*c*.

Figure 19A:
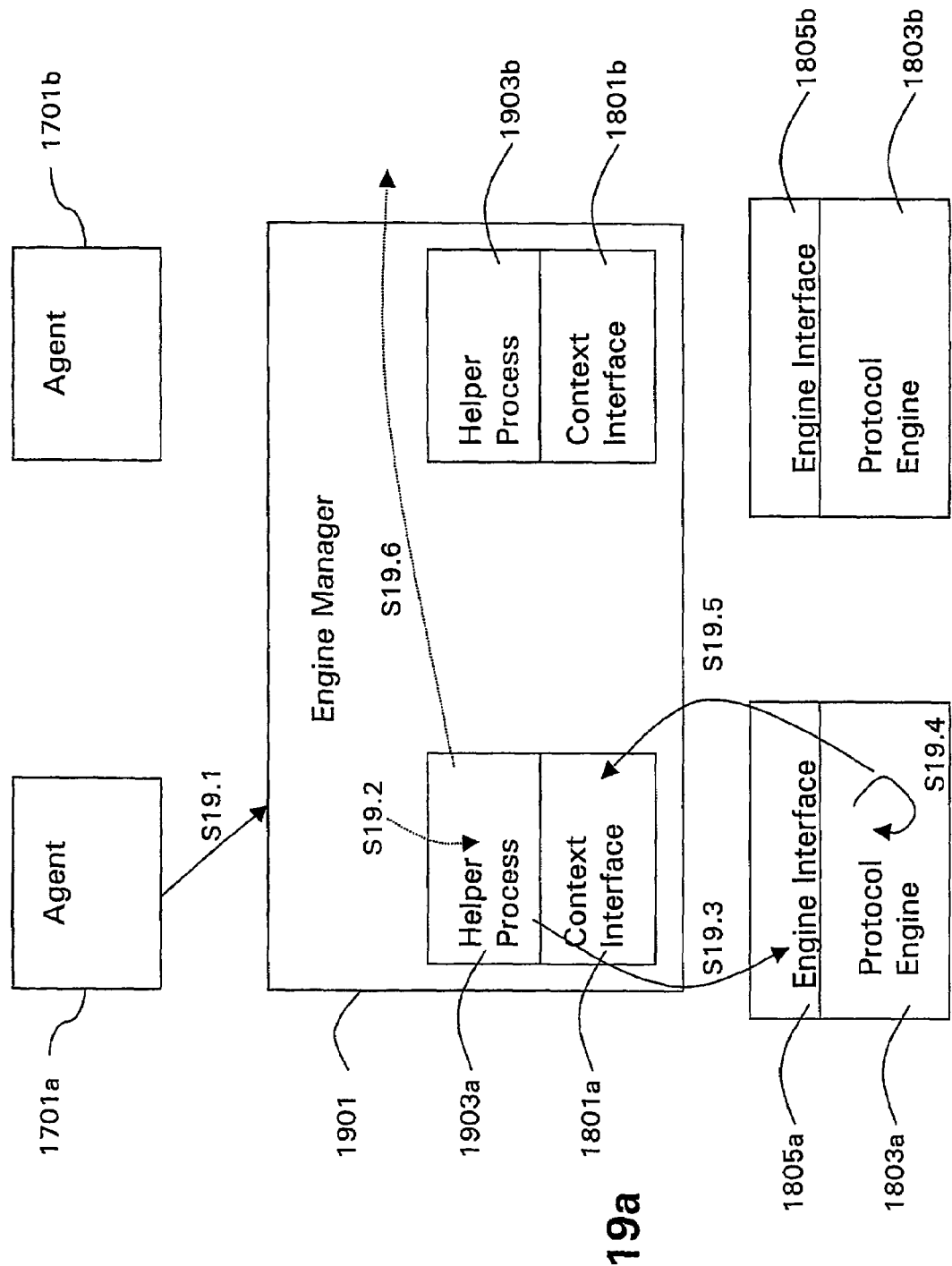
FIGS. 19a and 19b are schematic diagrams showing an embodiment of the invention implemented in a second agent arrangement, together with steps carried out thereby.

In an alternative configuration, the environment 1603*a* could include an engine manager 1901, as shown in FIG. 19*a*. This arrangement is particularly well suited to an environment 1603*a* comprising a plurality of service agents 1701*a*. In this arrangement, the engine manager 1901 acts as a centralised intermediary between service agents 1701*a*, 1701*b* and engines 1803*a*, 1803*b*, and has a plurality of processes, hereinafter referred to as "helper" processes 1903*a*, 1903*b*, each of which implements a context interface 1801*a*, 1801*b*. Each helper process is managed by the engine manager 1901 and has an identifier associated therewith, which enables the engine manager 1901 to route incoming messages to a corresponding protocol engine.

Figure 19B:
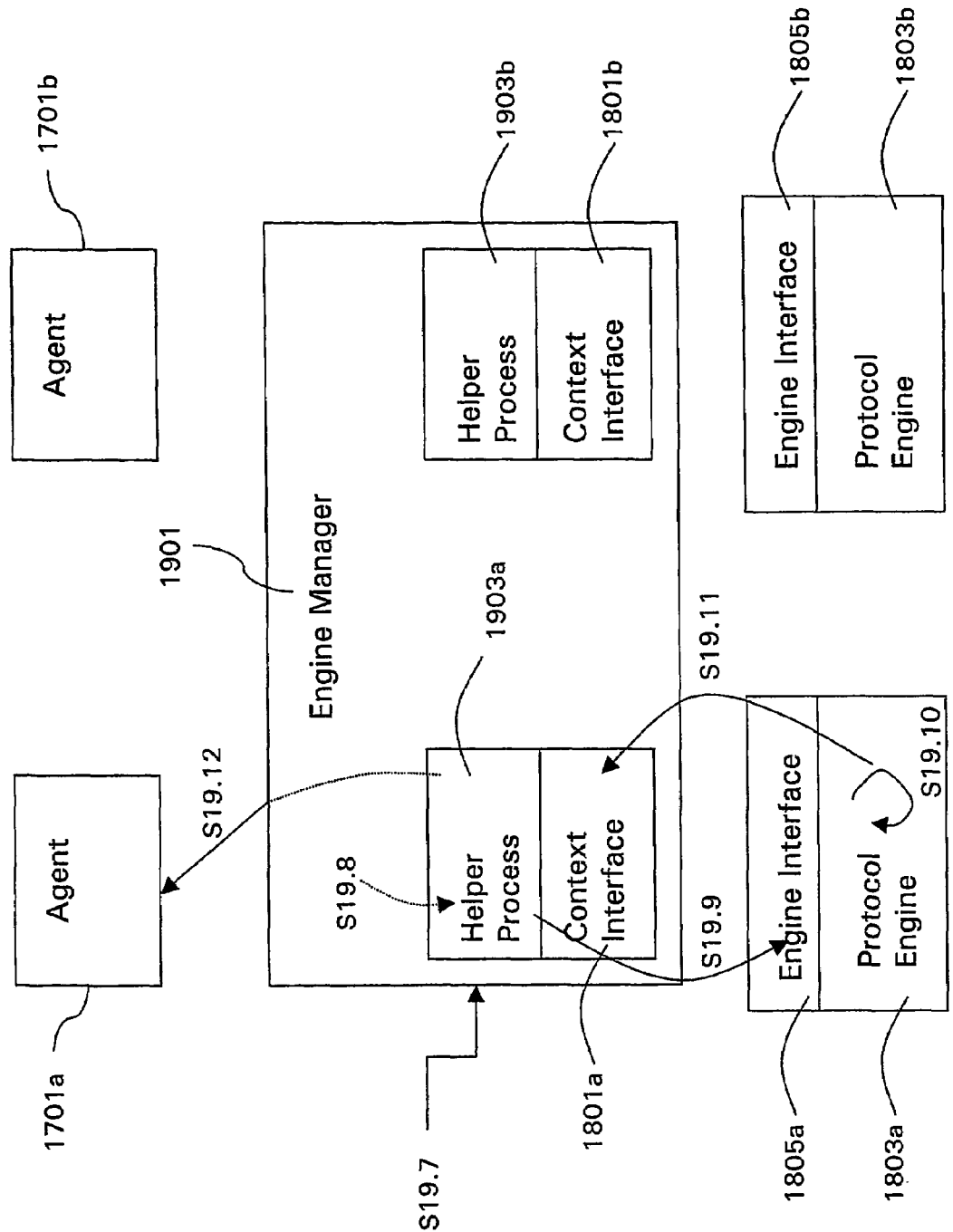

FIGS. 19*a* and 19*b* show an example of the interaction between these various components, specifically in respect of a FIND request generated by the service agent 1701*a*:

Referring to FIG. 19*a*, at step S19.1 the engine manager 1901 receives a "find request" message from one of the service agents 1701*a*. This means that the service agent 1701*a* wants to "look up" the address of, for example, another agent. Upon receipt of this message, the engine manager 1901 identifies S 19.2 a helper process corresponding to the agent that initiated the find request (in this example, helper process 1903*a*). This identified helper process 1903*a* then calls a S19.3 the "find" method that is local to the protocol engine 1803*a* associated with the identified helper process. Having processed the "find" method, at step S19.4, the protocol engine 1803*a* causes S19.5 the corresponding helper process 1903*a* to process method "sendMessage". This causes the protocol manager 1901 to send out S19.6 a FIND request to other agents, as described above with reference to FIG. 8. Referring to FIG. 19*b*, sometime later, a FOUND message is received S19.7 by the engine manager 1901, whereupon the message is passed S19.8 to the identified helper process 1903*a*. The identified helper process 1903*a* calls S19.9 the "handleMessage" corresponding to its associated protocol engine 1803*a* in respect of the received message. Having processed the incoming FOUND message (step S19.10) the protocol engine 1803*a* causes the helper process 1903*a* to process S19.11 its "findDone" method, which results in the engine manager 1901 passing S19.12 the result of the find query to the initiating service agent 1701*a*.

APPENDIX 1

As is known in the art, Interfaces provide a way of communicating with an object of a class, without having to know which class the object relates to. Using conventional methodology, one object (caller) can talk to objects of another class (callees) by importing the (entire) class definition for the latter in the source file of the former. A reference of type class is declared in the source of the former (which at runtime will point to a particular object instance). The class pointer may be used to access various public data members and methods of the class. Class interfaces are a portion of a class definition, which are selected from the class definition because they rarely, if ever, change (the interface may be defined before defining the class). Typically, an interface will comprise a small subset of the methods for a class (which itself may be a huge class). Several modules may standardise on the interface, regardless of changes to the underlying class definition.

The underlying (target) classes—in a first example the agents 1701*a* and protocol engine 1803—inherit the class interface to get that information into the target class. The interface class defines the methods as abstract methods (i.e., not-yet implemented methods), and the underlying class, in turn, provides functionality for the interface methods (i.e. implements the functionality).

Essentially, Interfaces allow general classes to interact with other classes, without either knowing what these classes are or putting unnecessary constraints on them. In other words, Interfaces ensure that there are no unnecessary dependencies between classes in different software applications, whilst at the same time ensuring that the applications can work together.

In the context of the implementation described above, the class that implements the protocol engine 1803 (and which implements the engine interface 1805) is not specific to the application, to DIET, or to anything else. It is a general class that can be used by any application. So although, in the example application described herein, the protocol engine 1803 interacts with agents (either service agent 1701*a*, as in FIG. 18, or the Engine Manager 1901*a*, as in FIG. 19), there is no application-specific code in the source code for the protocol engine 1803 at all. This means that the class does not rely on the DIET software and can be compiled and used without it.

What is claimed is:

1. Apparatus for use in retrieving information relating to a node in a network, wherein the network includes a plurality of nodes and communications links therebetween, the apparatus comprising:

receiving means arranged to receive, on behalf of a node, a request in respect of information relating to a target node including a request for a network address of the target node, the request including an identifier indicative of location of the target node in a virtual space, wherein the location is independent of physical location and network address;

sending means arranged to send, on behalf of said node, a request in respect of said target node, onward to another node;

storage arranged to store data in respect of a plurality of nodes, the data including, for each such node, an identifier indicative of location of the node and a network address corresponding thereto in said virtual space, wherein the location is independent of physical location and network address;

evaluating means arranged to evaluate distance between the locations of two nodes in said virtual space;

the apparatus being arranged, upon receipt of such a request, to translate the target node's ID into coordinates in virtual space and to evaluate the distance between the locations of each of a plurality of evaluated nodes and the target location, at least one of said plurality of evaluated nodes being the receiving node, and to identify which of the plurality of evaluated nodes are closer to the target node than the receiving, node is to the target node in said virtual space, and wherein the sending means sends the request to one of the identified nodes.

2. Apparatus according to claim 1, wherein the sending means is arranged to select a node from identified nodes in dependence on either or both of (a) degree of proximity to the target node in said virtual space or/and (b) transmission characteristics between the receiving node and the identified node.

3. Apparatus according to claim 1, including transforming means arranged to transform an identifier into a location in said virtual space, wherein, in use, the transforming means transforms the identifier corresponding to the target node to a target location.

4. Apparatus according to claim 1, wherein:

the receiving means is arranged to identify the node from which the request message originated, and the sending means is arranged to send a response message to the originating node in the event that none of the identified nodes are closer to the target node in said virtual space than the receiving node is to the target node, the response message including the requested information relating to the receiving node.

5. Apparatus according to claim 1, wherein the data stored in the storage includes an inter-node distance and, for at least some of the plurality of nodes, distance values associated therewith, and the apparatus includes:

quantifying means arranged to estimate the distribution of locations of nodes in the network, and to quantify the same as the inter-node distance;

modifying means arranged to modify a distance value associated with one of the plurality of nodes in accordance with an exponential expression involving the inter-node distance;

the apparatus being arranged, in use, such that the quantifying means estimates and quantifies inter-node distance, and, for at least one of the stored plurality of nodes, the modifying means modifies the distance value corresponding thereto in dependence on a selective modification criterion.

6. Apparatus according to claim 5, wherein the selective modification criterion involves a stochastic value dependent on successively quantified inter-node distances.

7. Apparatus according to claim 5, including:

creating means arranged to create an identifier for a target node such that the location of the target node is separated from the location of the receiving node by the modified distance value and wherein in use:

the creating means creates an identifier for a target node whose location is separated from the location of the receiving node by the modified distance value, and the sending means sends a request in respect of said target node.

8. Apparatus according to claim 5, wherein:

the distribution estimated by the quantifying means is dependent on the locations of at least some of the plurality of nodes in the storage that do not have distance values associated therewith.

9. Apparatus according to claim 1, wherein:

the storage is arranged to update the stored data in response to input from the evaluating means, and the receiving means is arranged to identify e type of message received by a node;

the apparatus being arranged, in receipt of a message, such that the receiving means identifies the type, and originating location, of the received message, and, if the message is identified as being a message requiring action, the evaluating means (a) evaluates the distance between the locations of each of a plurality of nodes and that of the originating node, at least one of the evaluated plurality being the said node, (U) identifies which of the plurality of nodes is closest to the originating node, and, (c) if the identified node is the said node, the storage adds data items in respect of the originating node.

10. Apparatus according to claim 9, wherein data items in respect of one of the plurality of nodes are replaced with the data items in respect of the originating node.

11. Apparatus according to claim 1, wherein the request in respect of information relating to a target node includes a request for data from the target node.

12. A network management system including:

a plurality of nodes and communications links therebetween, wherein each node of the plurality has apparatus according to claim 1.

13. A system according to claim 12, wherein the nodes are representative of computers, databases, files, mobile software agents, service providers and/or data items accessible via the network.

14. Network management apparatus, wherein:

the network includes a plurality of nodes and communications links therebetween, each node is arranged to send a message through the network, the message including an identifier indicative of the location in virtual space of the node from which the message originated, and the location in said virtual space is independent of physical location and network address, the apparatus comprising:

receiving means arranged to identify the type of message received by a node including a request for a network address of a target node;

storage arranged to store data in respect of a plurality of nodes, the data including, for each such node, an identifier indicative of location of the node in said virtual space and a network address corresponding thereto, wherein the location in said virtual space is independent of physical location and network address;

evaluating means arranged to evaluate distance between locations of two nodes in virtual space;

the apparatus being arranged, in receipt of a message, such that the receiving means identifies the type of message, and, if the message is identified as being a message requiring action, the evaluating means translates the target node's ID into coordinates in virtual space and evaluates the distance between the locations of each of a plurality of evaluated nodes in virtual space and that of the originating node and identifies which of the plurality of nodes is closest to the originating node in virtual space, wherein the plurality of evaluated nodes includes the receiving node, and, if the identified node is the receiving node, data items in respect of the originating node are added to the storage.

15. Apparatus according to claim 14, including:

transforming means arranged to transform an identifier into a location in said virtual space, wherein the location is independent of both physical location and network address of the associated node, and wherein the transforming means transforms an identifier corresponding to the originating node to an originating location in virtual space.

16. Apparatus according to claim 14, includes sending means arranged to send a message to another node, wherein the sending means sends the message to the identified node in the event that the identified node is not the receiving node.

17. Apparatus according to claim 14, wherein:

if the message is identified as being an onward transmission type of message, the sending means is arranged to review the lifetime of the message, and, in the event that the lifetime has not expired, the sending means is arranged to send the message to another node.

18. Apparatus according to claim 14, including:

generating means for generating messages requiring action, the generating means being operable to receive input from the sending means in the event that the lifetime of an onward transmission type of message is deemed to have expired, and to generate a message requiring action in response to the input.

19. Apparatus according to claim 18, wherein the sending means is arranged to send the message requiring action to another node.

20. Apparatus according to claim 19, wherein the sending means is arranged to select one of the plurality of nodes stored in the storage, so that the other node to which the message is sent is one of said plurality.

21. Apparatus according to claim 14, wherein data items in respect of one of the plurality of nodes are replaced with the data items in respect of the originating node.

22. A network management system including:
   a plurality of nodes and communications links therebetween, wherein each node of the plurality comprises apparatus according to claim 14.

23. A method of retrieving information relating to a node in a network, the network including a plurality of nodes and communications links therebetween, the method comprising:
   sending a request from a first node in respect of information relating to a target node including a request for a network address of the target node, the request including an identifier indicative of the location of the target node in a virtual space, wherein the location is independent of physical location and network address;
   receiving the request at a second node;
   accessing data at the second node in respect of a plurality of nodes, the data including, for each such node, an identifier indicative of location of the node in said virtual space and a network address corresponding thereto, wherein the location is independent of physical location and network address;
   translating at the second node the target node's ID into coordinates in virtual space and evaluating at the second node the distance in said virtual space between the locations of each of a plurality of nodes and the target location, at least one of the plurality being the second node,
   identifying at said second node which of the plurality of nodes are closer to the target node than the second node is to the target node in said virtual space; and
   sending from the second node the request to one of the identified nodes.

24. A method according to claim 23, in which the second node selects a node from the identified nodes in dependence on either or both of degree of proximity to the target node or/and transmission characteristics between the second node and the identified node.

25. A method according to claim 23, including
   transforming the identifier of the target node into a target location.

26. A method according to claim 23, in which the accessed data includes an inter-node distance and, for at least some of the plurality of nodes, distance values associated therewith, the method including:
   quantifying the distribution of nodes in the network as an inter-node distance in said virtual space; and
   modifying a distance value associated with one of the plurality of nodes in accordance with an exponential expression involving the inter-node minimum distance.

27. A method according to claim 26, including creating an identifier for a target node such that the location of the target node is separated from the location of the receiving node by the modified distance value, and sending a request in respect of said target node.

28. A method according to claim 23 in which the second node:
   identifies the type of message, and, if the message is identified as being a message requiring action,
   evaluates the distance between the locations of each of a plurality of nodes and that of the originating node, at least one of the evaluated plurality being the said node,
   identifies which of the plurality of nodes is closest to the originating node, and, if the identified node is the said node, storing data items in respect of the originating node.

29. A method according to claim 23, wherein the request in respect of information relating to a target node includes a request for data from the target node.

30. A network management method, the network including a plurality of nodes and communications links therebetween, the method comprising:
   identifying the type of message received by a node including a request for a network address of a target node and, if the message is identified as being a message requiring action, identifying, from the received message, an identifier indicative of the location of the node in a virtual space from which the received message originated, wherein the location is independent of physical location and network address;
   accessing data in respect of a plurality of nodes, the data including, for each such node, an identifier indicative of location of the node in said virtual space and a network address corresponding thereto, wherein the location in virtual space is independent of physical location and network address;
   translating the target node's ID into coordinates in virtual space and evaluating the distance between the locations in said virtual space of each of a plurality of nodes and that of the originating node, the plurality including the receiving node and the said plurality of nodes,
   identifying which of the evaluated plurality of nodes is closest in said virtual space to the originating node, and, if the identified node is the receiving node, storing data items in respect of the originating node.

31. A method according to claim 30, including transforming the identifier corresponding to the originating node to an originating location.

32. A method according to claim 30, including sending a message to the identified node in the event that the identified node is not the receiving node.

33. A method according to claim 30, in which, if the message is identified as being an onward transmission type of message, the method includes reviewing the lifetime of the message, and, in the event that the lifetime has not expired, sending the message to another node.

34. A method according to claim 33, including generating a message requiring action in the event that the lifetime of an onward transmission type of message is deemed to have expired.

35. A method according to claim 34, including sending the message requiring action to another node.

36. A method according to claim 35, including selecting data in respect of one of the accessible plurality of nodes, so that the other node to which the message is sent is one of the said plurality.

37. A computer program product embodied on a computer readable medium, the program product comprising a set of instructions to cause a computer, or a suite of computers, to:
   a) receive a request at a node in respect of information relating to a target node, the request including an identifier indicative of the location of the target node in a virtual space, wherein the location is independent of physical location and network address;
   access data in respect of a plurality of nodes, the data including, for each such node, an identifier indicative of location of the node in said virtual space and a network address corresponding thereto, wherein the location is independent of physical location and network address;
   translating the target node's ID into coordinates in virtual space and evaluating the distance in said virtual space between the locations of each of a plurality of nodes and the target location, at least one of the plurality being the receiving node, identifying which of the plurality of nodes is closest to the target node, and, if the identified node is a node other than the receiving node, the receiving node sending the request to the identified node; and/or b) identify the type of message received by a node and, if the message is identified as being a message requiring action, identifying, from the received message, an identifier indicative of the location of the node in said virtual space from which the received message originated, wherein the location is independent of physical location and network address; accessing data in respect of a plurality of nodes, the data including, for each such node, an identifier indicative of location in virtual space of the node and a network address corresponding thereto, wherein the location is independent of physical location and network address; evaluate the distance in virtual space between the locations of each of a plurality of nodes and that of the originating node, the plurality including the receiving node and the said plurality of nodes, identifying which of the evaluated plurality of nodes is closest to the originating node, if the identified node is the receiving node, storing data items in respect of the originating node, if the identified node is not the receiving node, sending the message to the identified node; and/or c) identify the type of message received by a node and, if the message is identified as being an onward transmission type of message, reviewing the lifetime of the message, and, in the event that the lifetime has not expired, sending the message to another node.

\* \* \* \* \*